United States Patent
Al Sayeed et al.

(10) Patent No.: US 11,223,423 B1
(45) Date of Patent: Jan. 11, 2022

(54) RE-CALIBRATING AN IN-SERVICE OPTICAL MULTIPLEX SECTION (OMS)

(71) Applicant: Ciena Corporation, Hanover, MD (US)

(72) Inventors: Choudhury A. Al Sayeed, Stittsville (CA); David C. Bownass, Ottawa (CA); Robert Palmer, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/130,508

(22) Filed: Dec. 22, 2020

(51) Int. Cl.
| | | |
|---|---|---|
| *H04B 10/27* | (2013.01) | |
| *H04B 10/071* | (2013.01) | |
| *H04B 10/079* | (2013.01) | |

(52) U.S. Cl.
CPC .......... *H04B 10/27* (2013.01); *H04B 10/071* (2013.01); *H04B 10/0795* (2013.01)

(58) Field of Classification Search
CPC ............ H04B 10/071; H04B 10/07953; H04B 10/27; H04J 14/02
See application file for complete search history.

(56) References Cited

U.S. PATENT DOCUMENTS

| | | |
|---|---|---|
| 8,364,036 B2 | 1/2013 | Boertjes et al. |
| 8,509,621 B2 | 8/2013 | Boertjes et al. |
| 9,344,191 B2 | 5/2016 | Al Sayeed et al. |
| 9,419,708 B2 | 8/2016 | Rad et al. |
| 9,485,013 B2 | 11/2016 | Al Sayeed et al. |
| 9,577,763 B2 | 2/2017 | Al Sayeed et al. |
| 9,729,265 B2 | 8/2017 | Hurley et al. |
| 9,768,902 B2 | 9/2017 | Al Sayeed et al. |
| 9,774,392 B2 | 9/2017 | Doucet et al. |
| 9,806,803 B2 | 12/2017 | Bownass et al. |
| 9,882,634 B1 | 1/2018 | Al Sayeed et al. |
| 9,906,294 B2 | 2/2018 | Al Sayeed et al. |
| 9,918,148 B2 | 3/2018 | Swinkels et al. |
| 9,973,295 B2 | 5/2018 | Al Sayeed et al. |
| 9,985,726 B1 | 5/2018 | Al Sayeed et al. |
| 9,986,317 B1 | 5/2018 | Al Sayeed et al. |
| 10,063,313 B1 | 8/2018 | Al Sayeed et al. |
| 10,237,011 B2 | 3/2019 | Al Sayeed et al. |
| 10,361,957 B1 | 7/2019 | MacKay et al. |
| 10,439,709 B1 | 10/2019 | Al Sayeed |
| 10,530,516 B2 * | 1/2020 | Jiang .................... H04J 14/0261 |

(Continued)

FOREIGN PATENT DOCUMENTS

| | | |
|---|---|---|
| EP | 2 993 807 B1 | 1/2018 |
| WO | 2020/102011 A1 | 5/2020 |

*Primary Examiner* — Dzung D Tran
(74) *Attorney, Agent, or Firm* — Clements Bernard Baratta; Lawrence A. Baratta, Jr.; Christopher L. Bernard

(57) ABSTRACT

Systems and methods are provided for re-calibrating an in-service Optical Multiplex Section (OMS) while it is operating in an optical system. A method, according to one implementation, includes a step of analyzing a state of at least one component of the in-service OMS in an optical network, whereby the at least component may include, among other things, one or more fiber spans. Based on a need to re-calibrate the at least one component of the OMS, the method also includes the step of transitioning the OMS from an in-service mode to a maintenance mode to prepare the OMS for re-calibration. At this point, a re-calibration procedure can be performed. In response to completing the re-calibration procedure, the method includes the step of transitioning the OMS from the maintenance mode back to the in-service mode.

20 Claims, 15 Drawing Sheets

(56) References Cited

U.S. PATENT DOCUMENTS

| | | | |
|---|---|---|---|
| 10,536,235 | B2 | 1/2020 | Al Sayeed et al. |
| 10,560,212 | B2 | 2/2020 | Al Sayeed et al. |
| 10,587,339 | B1 | 3/2020 | Al Sayeed et al. |
| 10,680,737 | B1 | 6/2020 | Al Sayeed et al. |
| 10,686,543 | B1 | 6/2020 | Al Sayeed et al. |
| 10,735,837 | B1 | 8/2020 | Al Sayeed et al. |
| 10,826,601 | B2 | 11/2020 | Bhatnagar et al. |
| 10,826,641 | B1 | 11/2020 | Al Sayeed et al. |
| 10,833,791 | B1 | 11/2020 | Al Sayeed |
| 2002/0048066 | A1* | 4/2002 | Antoniades ......... H04J 14/0228 398/82 |
| 2019/0109638 | A1* | 4/2019 | Yilmaz ................. H04B 10/27 |
| 2019/0173602 | A1* | 6/2019 | Al Sayeed ............ H04J 14/021 |
| 2019/0253361 | A1 | 8/2019 | MacKay et al. |
| 2020/0059315 | A1 | 2/2020 | Al Sayeed et al. |
| 2020/0076499 | A1 | 3/2020 | Al Sayeed et al. |

\* cited by examiner

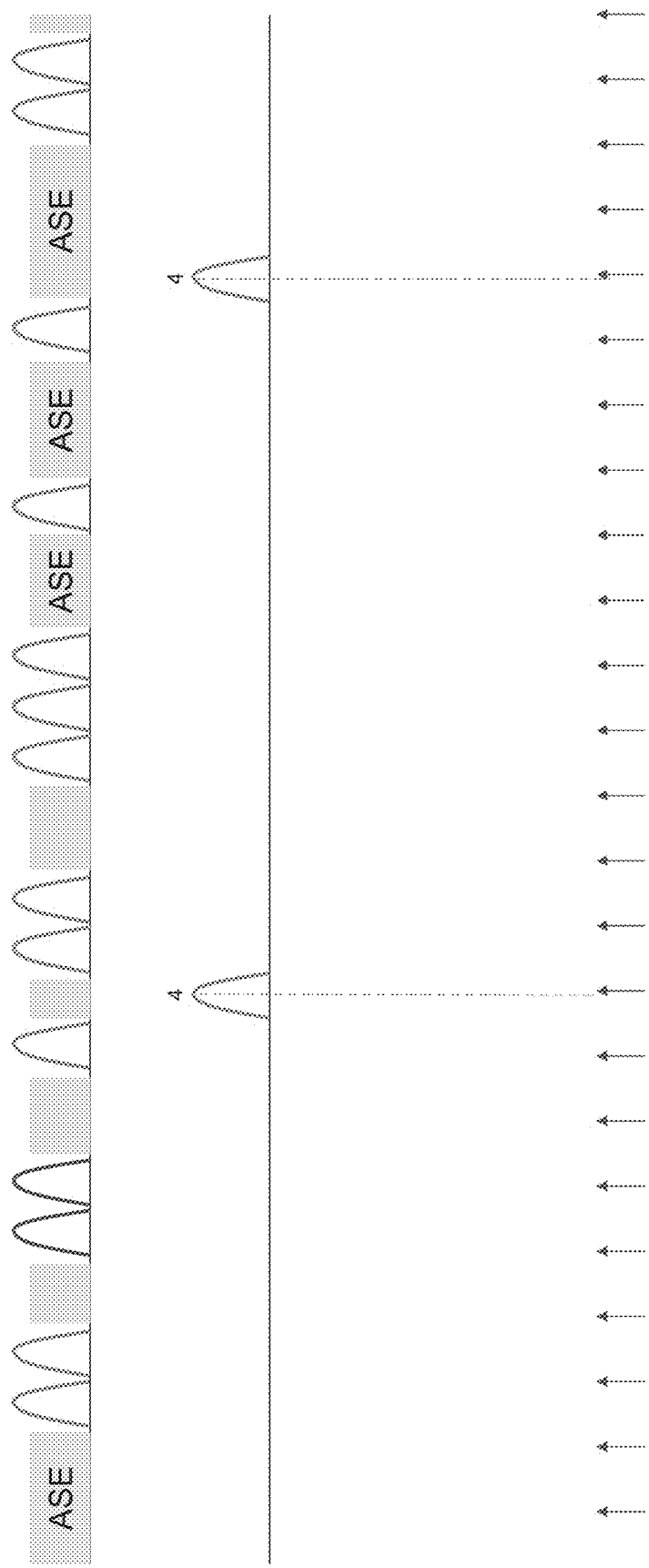

RE-CALIBRATING AN IN-SERVICE OPTICAL MULTIPLEX SECTION (OMS)

TECHNICAL FIELD

The present disclosure generally relates to optical networking systems and methods. More particularly, the present disclosure relates to re-calibrating an Optical Multiplex Section (OMS) of an optical network when the OMS is in service.

BACKGROUND

An Optical Multiplex Section (OMS) of an optical network is an all-optical section between Optical Add/Drop Multiplexers (OADMs), and the OMS may be configured such that optical signals are handled in a predefined manner. For instance, the OMS may include signals within a predetermined Media Channel (MC) having a predetermined spectral bandwidth. In some systems, the MC may include the optical C-band, which ranges from about 1530 nm to 1565 nm. The OMS can include multiple channels, referred to as Network Media Channels (NMCs), where each channel (NMC) carries a specific range of bandwidths and can be within a specific portion of the MC.

An empty channel in an OMS can be filled with an Amplified Spontaneous Emission (ASE) channel holder used as a filler channel to load the spectrum. It is possible in the OMS to add and/or drop channels of optical signals carrying data and may also add and/or drop ASE filler channels. In addition to the provisioning of channels with respect to spectrum power profiles, it is also possible to calibrate the OMS to provide optimal gains for amplifiers (e.g., Raman amplifiers, Erbium-Doped Fiber Amplifiers (EDFAs), etc.) and to provide optimal settings for launch power parameters of multiplexers and demultiplexers in the OMS. In this regard, an initial calibration process can be executed when the OMS is deployed in an optical system for optimal performance of the OMS.

Typically, the initial calibration is not changed throughout the lifetime of the OMS. When changes are made within the OMS itself or when other factors are changed that may affect the OMS, the initial settings are maintained. Currently, there are no systems or methods for performing a "re-calibration" process on an ASE-loaded OMS. There is therefore a need in the field of optical systems for re-calibrating an ASE-loaded OMS, particularly when changes are made to the OMS environment during the lifetime of the OMS.

BRIEF SUMMARY

According to an implementation of the present disclosure, a system may include a processing device and a memory device configured to store a computer program having instructions that, when executed, enable the processing device to analyze a state of at least one component of an in-service Optical Multiplex Section (OMS) in an optical network. Based on a need to re-calibrate the at least one component of the OMS, the instructions enable the processing device to transition the OMS from an in-service mode to a maintenance mode to prepare the OMS for re-calibration. At this point, the processing device is configured to perform a re-calibration procedure. In response to completing the re-calibration procedure, the instructions further enable the processing device to transition the OMS from the maintenance mode back to the in-service mode.

According to another implementation of the present disclosure, a non-transitory computer-readable medium comprises instructions that, when executed, enable one or more processing devices to analyze a state of at least one component of a plurality of components of an in-service Optical Multiplex Section (OMS) in an optical network, where the plurality of components may include one or more fiber spans. Based on a need to re-calibrate the at least one component of the OMS, the instructions enable the one or more processing devices to transition the OMS from an in-service mode to a maintenance mode to prepare the OMS for re-calibration. The one or more processing devices are then configured to perform a re-calibration procedure. In response to completing the re-calibration procedure, the instructions enable the one or more processing devices to transition the OMS from the maintenance mode back to the in-service mode.

According to yet another implementation of the present disclosure, a method is provided that includes the step of analyzing a state of at least one component of a plurality of components of an in-service Optical Multiplex Section (OMS) in an optical network, where the plurality of components may include one or more fiber spans. Based on a need to re-calibrate the at least one component of the OMS, the method includes the step of transitioning the OMS from an in-service mode to a maintenance mode to prepare the OMS for re-calibration. Also, the method includes performing a re-calibration procedure. In response to completing the re-calibration procedure, the method further includes the step of transitioning the OMS from the maintenance mode back to the in-service mode.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 6A-6G are diagrams illustrating examples of channel bundling, according to various embodiments.

DETAILED DESCRIPTION

Figure 1:
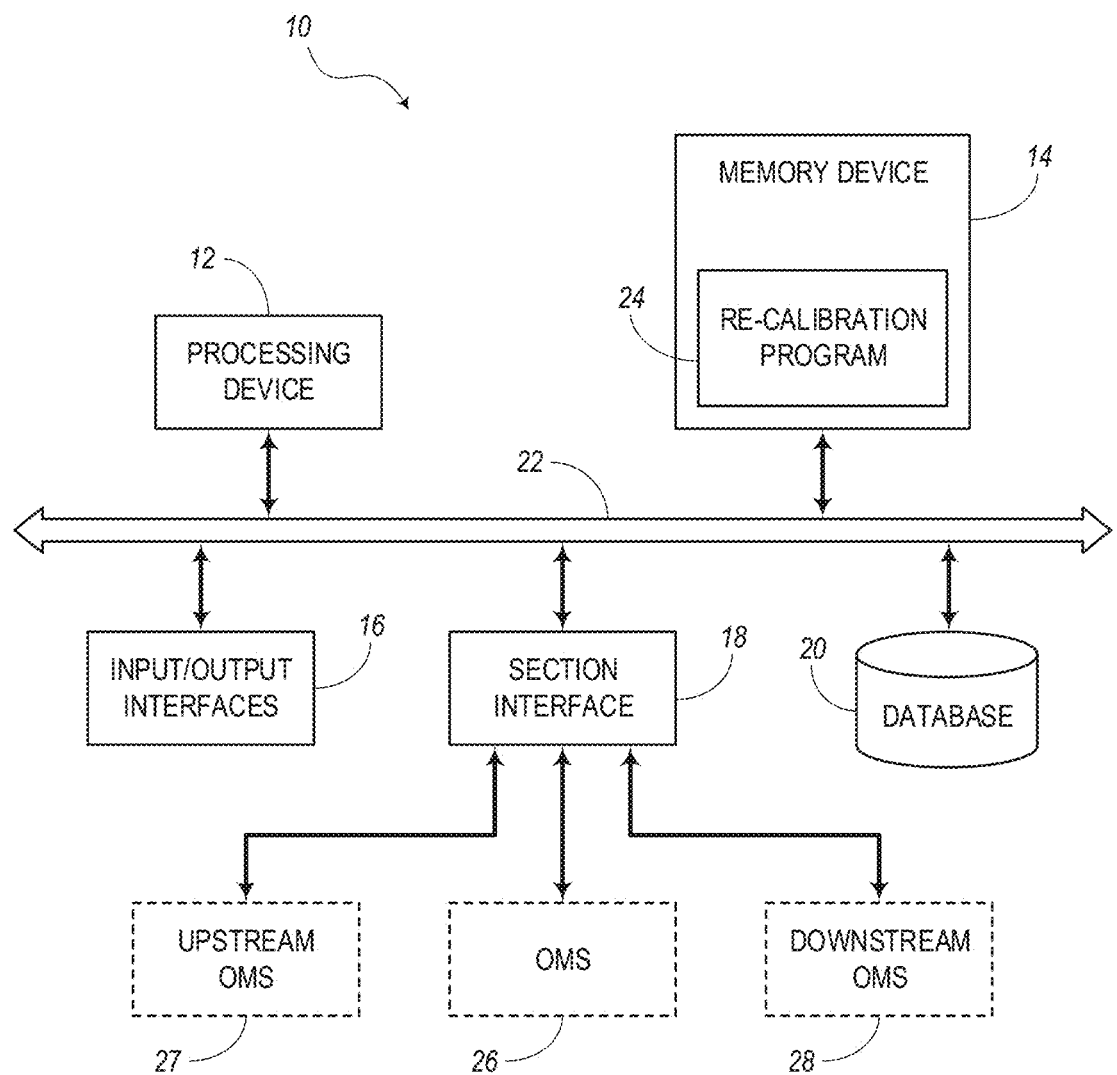
FIG. 1 is a block diagram illustrating an OMS orchestrator for controlling or orchestrating the settings of various elements of an Optical Multiplex Section (OMS) located within an optical network, according to various embodiments of the present disclosure.

The present disclosure relates to systems and methods for calibrating and re-calibrating an Optical Multiplex Section (OMS) positioned between Optical Add/Drop Multiplexers (OADMs) in an optical network. In particular, the OMS may include optical signals that can be waveforms within a predetermined Media Channel (MC), as well as in the C-band (i.e., about 1530 nm to 1565 nm), the L-band (i.e., about 1565 nm to 1625 nm), C+L-band (i.e., about 1530 nm to 1625 nm), or another suitable spectrum. Within the entire MC, the waveforms may be confined to specific channels or Network Media Channels (NMCs). Unused NMCs may be filled with Amplified Spontaneous Emission (ASE) channel holders or ASE filler channels.

Calibration processes may be performed when equipment, in the OMS, is deployed in an optical network. As mentioned above, this calibration process is usually performed only once at deployment and does not change during the lifetime of the OMS. However, since certain modification can be made within an OMS during its lifetime, it would be advantageous to allow re-calibration processes to be performed as well. Therefore, the embodiments of the present disclosure are configured to perform re-calibration for an in-service OMS or other portion of an optical network, particularly an OMS that is configured in the network to propagate ASE-loaded optical signals.

To allow re-calibration processes in an in-service system and in order to reduce the impact to downstream OMSs, two different options may be developed. For example, a first option may include de-provisioning all the photonic services traversing optical links throughout the OMS. However, this option would likely be disruptive to the ongoing operations of the OMS.

Thus, a second option may include de-provisioning the MC and NMCs at both ends of an OMS having a multiplexer at an upstream end and a demultiplexer at a downstream end. The de-provisioning of the MC and NMCs in the OMS would ensure that all the optical power density at the multiplexer would be sourced from a single optical source, such as an ASE source. In addition, the de-provisioning of the MC and NMCs in the OMS would ensure that the optical power density changes at the demultiplexer, due to the re-calibration activities, would not flow to downstream OMSs. The de-provisioning process may include de-provisioning channels (e.g., NMCs) in bundles to allow a more graceful modification to the OMS. Otherwise, if existing channels occupying significant portions of the spectrum were to be de-provisioned all at one time (in one bundle), this sudden change may result in a negative impact to downstream traffic. Bundling strategies are described in more detail below.

Since de-provisioning all of the channels would be considered a substantial maintenance activity and would have been considered a significant bottleneck for customer operations, conventional systems have been unwilling to attempt such a feat. It may have been feared by those of skill in the art that de-provisioning would increase the length of a maintenance window significantly and hence would lengthen the service outage. It may have also been feared that there would be difficulty with adding all the channels back once the re-calibration process is completed successfully. Despite the reluctance to face these issues by conventional systems, the embodiments of the present disclosure are nevertheless configured to perform certain implementations of de-provisioning in order to re-calibrate an OMS.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of an OMS orchestrator 10 for controlling or orchestrating the settings of various elements of an OMS 26 located within an optical network. In the illustrated embodiment, the OMS orchestrator 10 may be a digital computer that, in terms of hardware architecture, generally includes a processing device 12, a memory device 14, Input/Output (I/O) interfaces 16, a section interface 18, and a database 20. The memory device 14 may include a data store, database (e.g., database 20), or the like. It should be appreciated by those of ordinary skill in the art that FIG. 1 depicts the OMS orchestrator 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the OMS orchestrator 10, a semiconductor-based microprocessor (in the form of a microchip or chip set), or generally any device for executing software instructions. When the OMS orchestrator 10 is in operation, the processing device 12 may be configured to execute software stored within the memory device 14, to communicate data to and from the memory device 14, and to generally control operations of the OMS orchestrator 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The section interface 18 may be used to enable the OMS orchestrator 10 to communicate to a corresponding OMS 26 or one or more components of the corresponding OMS 26. Some communication may be performed over a network, a control plane, the Internet, a Wide Area Network (WAN), a Local Area Network (LAN), and the like. For example, the embodiments of the present disclosure may include multiple OMS orchestrator where each one is configured to control one component of an OMS and may be configured to communication with other OMS orchestrators (e.g., via a control plane). The section interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The section interface 18 may include address, control, and/or data connections to enable appropriate communications on the OMS 26 or one or more components of the OMS 26.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the OMS orchestrator 10 and may include, for example, an internal hard drive connected to the local interface 22 in the OMS orchestrator 10. Additionally, in another embodiment, the data store may be located external to the OMS orchestrator 10 and may include, for example, an external hard drive connected to the Input/Output (I/O) interfaces 16 (e.g., SCSI or USB connection). In a further embodiment, the data store may be connected to the OMS orchestrator 10 through a network and may include, for example, a network attached file server.

Moreover, some embodiments may include a non-transitory computer-readable storage medium having computer readable code stored in the memory device 14 for programming the OMS orchestrator 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

According to some embodiments, the memory device 14 may be configured to store one or more programs for controlling the OMS 26. For example, as shown in FIG. 1, the memory device 14 may include a re-calibration program 24 configured for re-calibrating the OMS 26 as needed. The functionality of the re-calibration program 24 is described throughout the present disclosure, whereby instructions of the re-calibration program 24 may be configured to enable the processing device 12 to perform certain re-calibration functions. According to various examples, the re-calibration program 24 may be implemented in software or firmware (i.e., on the memory device 14) and/or may be implemented in hardware of the processing device 12 (e.g., in the form of an ASIC). Thus, the re-calibration program 24 allow the processing device 12 to re-calibrate the OMS 26 as needed or upon demand or request.

Figure 2:
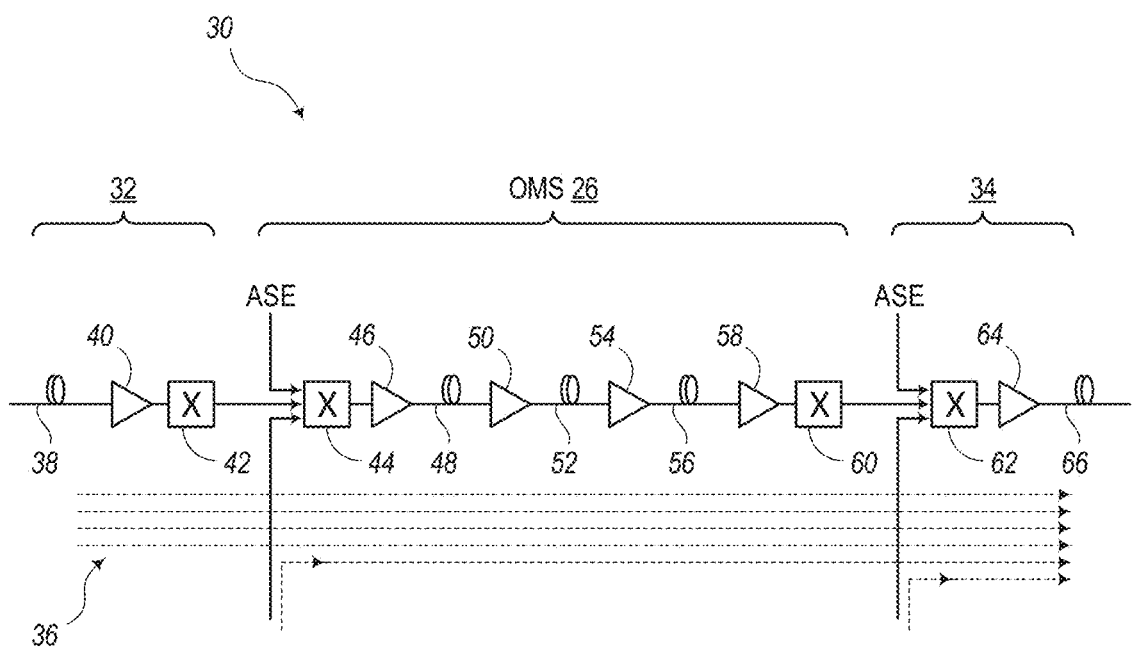
FIG. 2 is a diagram showing a portion of an optical network having an OMS, according to various embodiments.

FIG. 2 is a diagram showing a portion of an optical network 30. The OMS 26, which is controlled by the OMS orchestrator 10 of FIG. 1, is arranged between an upstream section 32 and a downstream section 34. The upstream section 32 and downstream section 34 may be portions of adjacent OMSs, Intermediate Line Amplifiers (ILAs), network elements, nodes, or other components of the optical network. Traffic signals 36 are propagated through the OMS 26, whereby channels may be added and/or dropped by one or more multiplexers and demultiplexers.

As shown in FIG. 2, the upstream section 32 of the optical network 30 may include an upstream link 38, a pre-amplifier 40, and a demultiplexer 42 that provides demultiplexed signals to the OMS 26. In this example, the OMS 26 includes a multiplexer 44, a post-amplifier 46 (e.g., Raman amplifier), a first link 48 (e.g., optical link), a first ILA 50, a second link 52 (e.g., optical link), a second ILA 54, a third link 56 (e.g., optical link), a pre-amplifier 58, and a demultiplexer 60. The demultiplexer 60 of the OMS 26 provides demultiplexed signals to the downstream section 34. The downstream section 34 includes a multiplexer 62, a post-amplifier 64, and a downstream link 66.

In addition to receiving signals from the demultiplexer 42 from the upstream section 32, the multiplexer 44 of the OMS 26 may also be configured to receive ASE channel signals (e.g., from an ASE source). For example, the ASE channel signals may be configured as ASE filler channels for filling or loading the portions of the spectrum that are unused. This filling, or ASE-loading, may be achieved for the purpose of regulating the spectrum power density of the optical signals, regardless of how many channels are active. Also, the multiplexer 44 may be configured to add channels (i.e., additional traffic signals 36) from an adding element of the OMS 26. Similarly, the demultiplexer 60 may be configured to drop channels as needed.

The OMS orchestrator 10 of FIG. 1 may be configured to control settings or other operational parameters of the multiplexer 44 and/or demultiplexer 60. In some cases, one OMS orchestrator 10 may be configured to control the multiplexer 44 and another may be configured to control the demultiplexer 60. Communication may be enabled between these two OMS orchestrators 10. The OMS orchestrator (or additional orchestrators) may also be configured to control the setting or other operation parameters of the post-amplifier 46, ILAs 50, 54, and pre-amplifier 58. The control of each of these components 44, 46, 50, 54, 58, 60 (by one or more OMS orchestrators) may be implemented during a re-calibration procedure as described throughout the present disclosure.

The systems and methods of the present disclosure are directed to re-calibration of ASE-loaded OMSs where existing channels are provisioned for operation over optical links. In some embodiments, the re-calibration process of an ASE-loaded optical link (e.g., OMS 26) may involve steps of re-loading ASE to the multiplexer 44 of the line system, re-calibrating the multiplexer 44 with respect to target launch spectrum power profiles and/or other setting or parameters associated with the multiplexer 44, re-setting all gain/loss actuators (e.g., Variable Optical Attenuators (VOAs)) associated with the amplifiers 46, 50, 54, 58, and running Raman gain scans on ILAs 50, 54 to find optimal gain settings for Raman amplifiers for each span (e.g., links 48, 52, 56) based on the measured fiber loss and fiber type. Normally, since re-calibration will likely impact traffic in the optical network 30, the re-calibration procedures may require a maintenance window to cover certain use cases.

Figure 3:
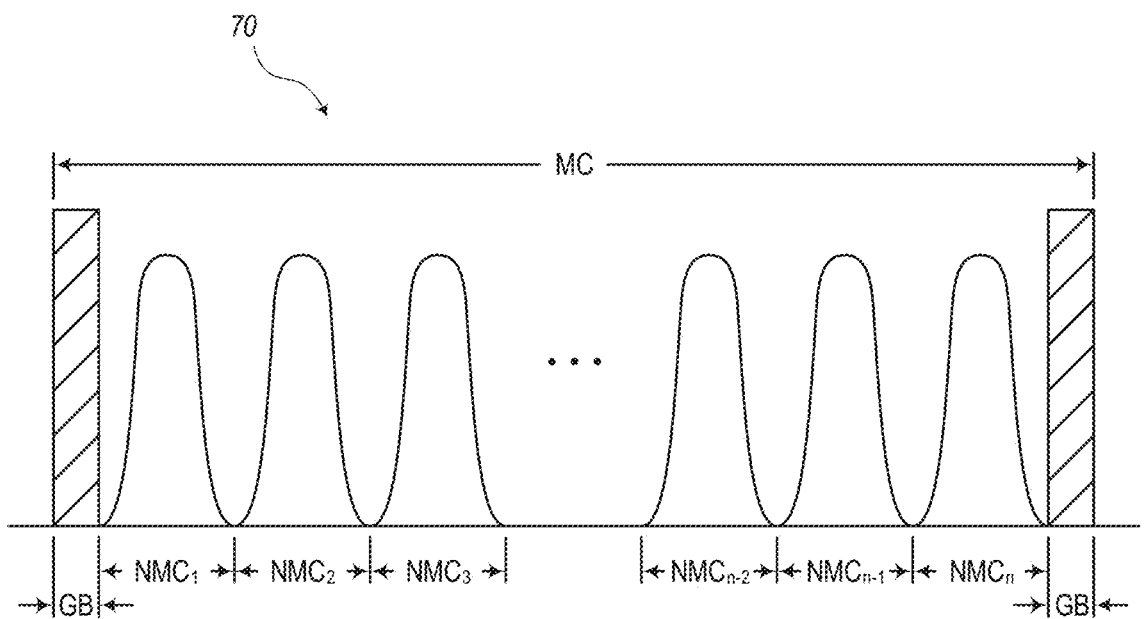
FIG. 3 is a graph showing an example of a Media Channel (MC) and a number of Network Media Channels (NMCs) or traffic channels.

FIG. 3 is a graph showing an example of a Media Channel (MC) 70, which may also be referred to as a "service media channel." The channels are represented in FIG. 3 as Network Media Channels (NMCs), which are shown with equal bandwidth ranges and are labeled $NMC_1$, $NMC_2$, ..., $NMC_n$. Each channel may include a pre-determined range of about 50 GHz, 100 GHz, or other suitable spacing, or, in alternative embodiments, may have variable ranges. The ends of the MC 70 may include Guard Bands (GBs).

It should be noted that an optical signal may include data traffic carried in multiple, but not all, of the channels (NMCs) of the MC 70. In this case, the empty NMCs may be filled with Amplified Spontaneous Emission (ASE) channel holders or ASE filler channels for filling in the empty space. The filler ASE channel holders are used to maintain a smooth power density profile. Therefore, in place of some of the NMCs shown in FIG. 3, ASE channel holders may be incorporated in the MC 70.

Reasons for Re-Calibration

In the optical network 30, re-calibration of the OMS 26 may be needed based on many different reasons. For example, re-calibration may be needed following an event in which a defective fiber in the OMS 26 is fixed or replaced and/or when a fiber is replaced with a different type of fiber (having different properties). Also, re-calibration may be needed following an event in which a component in the OMS 26 is replaced. The component may include Wavelength Selective Switching (WSS) components, amplifiers (e.g., Raman amplifiers, Erbium-Doped Fiber Amplifiers (EDFAs), etc.), Variable Optical Attenuators (VOAs), or other components in the OMS 26. Furthermore, re-calibration may be needed following any type of reconfiguration of the OMS 26 or line system. For example, re-calibration may be needed in the event that a Dynamic Gain-Flattening Filter (DGFF) is replaced. In these and other cases, the links 48, 52, 56 may need to be re-calibrated so that each actuator associated with the amplifiers 46, 50, 54 upstream with respect to the link of each span can properly deal with the impact of optical transmission characteristics, such as Stimulated Raman Scattering (SRS), gain ripple, spectral tilt, etc., generated per span.

Use Case: Re-Calibration of an OMS with Traffic Channels Present

Even after the channels are provisioned according to an initial calibration process and the OMS 26 is put into operation by carrying traffic for providing in-service functions, the ASE-loaded OMS 26 may still need to be re-calibrated according to any one or more of the various reasons discussed above. The re-calibration process may include re-loading ASE into the OMS 26, resetting target launch power profiles of the multiplexer 44, changing or maintaining old settings, re-setting gain/loss actuator values associated with amplifiers 46, 50, 54, 58 to ensure the ASE is achieving the given launch power targets per span.

The present embodiments are configured to address an issue with respect to existing channels that have already been initially calibrated in an already-deployed and in-service OMS. Specifically, re-calibration cannot normally be done with regular traffic channels (NMCs) present. With an already provisioned system in which channels are designated for certain uses, the existing traffic on the channels (NMCs) may not allow re-calibration while the OMS 26 is in service. Calibration requires full ASE-loading to generate smooth spectrum power profiles. The presence of channels will carve out calibrated power profiles, which may be incorrect if the channel population changes in the future. ASE loading and re-calibration activity on the line may create large power fluctuations (e.g., about 10-15 dB) that may impact traffic in downstream sections as light flows through downstream links. With channels de-provisioned, maintenance activity can be limited to the OMS of interest, instead of shutting down all downstream links or a large portion of the network.

To overcome the issues, one option is simply to de-provision all photonic services that are traversing the OMS 26 requiring re-calibration before triggering the re-calibration process. However, in a network, for a given link, there may be many photonic services (e.g., about 40 to 120 services or channels) traversing the OMS 26. Thus, de-provisioning all of them and then re-adding them following a re-calibration process would normally be a significant maintenance activity and may be undesirable since it may require a longer maintenance window and therefore longer traffic outage time.

A method according to one embodiment of the present disclosure is directed to a re-calibration process that does not require a user to de-provision the photonic services. The method may automatically coordinate with a section demultiplexer (e.g., the demultiplexer 60 of OMS 26) to block the propagation of light to downstream sections (e.g., downstream section 34) to allow the downstream sections to switch to their local ASE in a non-service affecting way. Also, the section multiplexer (e.g., the multiplexer 44 of OMS 26) may switch away all channels from traffic (NMCs) to ASE channel holders to start the re-calibration process. The re-calibration process may include re-loading the ASE, re-setting all the launch profiles and actuator settings, and adding the channels back at the section mux (in bundles) and allow light propagation to downstream by unblocking the section demux to re-enable traffic. In additional embodiments, some methods may be extended to trigger a bi-directional re-calibration process for an OMS having bi-directional propagation in order to ease network operation complexities.

The re-calibration program 24 shown in FIG. 1 may control both the multiplexer 44 and demultiplexer 60 of the OMS 26. In some embodiments, separate orchestrators may be configured in the system for controlling the multiplexer 44 and demultiplexer 60. Also, the orchestrator 10 may be configured to send instructions to adjacent (neighboring) OMSs (e.g., upstream OMS 32 and downstream section 34). FIGS. 4-9 show various embodiments of processes or procedures for executing the re-calibration program 24.

Figure 4:
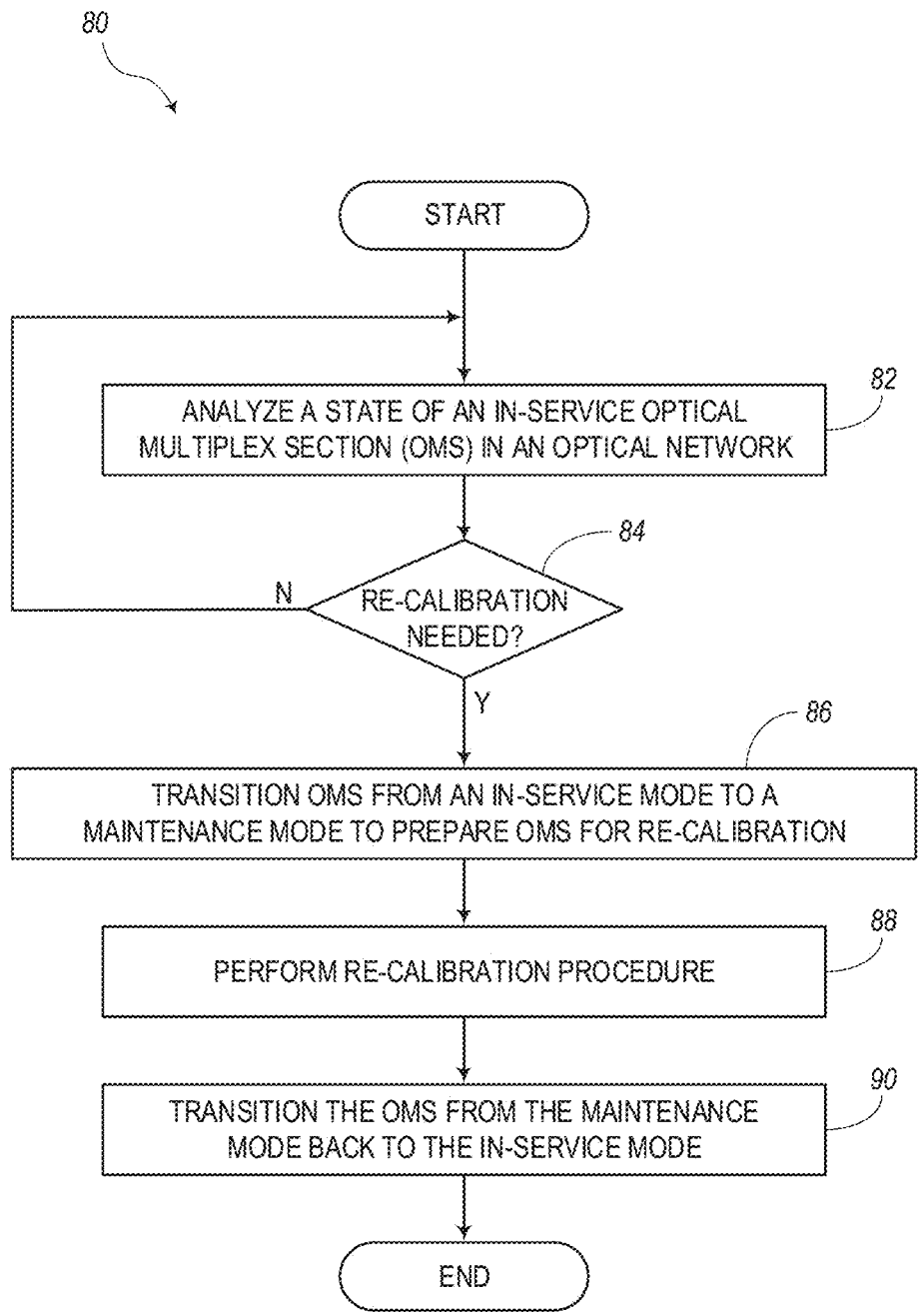
FIG. 4 is a flow diagram showing a general process for performing the main actions of the OMS orchestrator of FIG. 1 with respect to an OMS, according to various embodiments of the present disclosure.

FIG. 4 is a flow diagram showing an embodiment of a general process 80 for performing the main actions of the orchestrator 10 with respect to an OMS (e.g., OMS 26). The general process 80 of FIG. 4 includes the step of analyzing the state of at least one component of an in-service Optical Multiplex Section (OMS) operating in an optical network, as indicated in block 82. For example, the at least one component of the OMS may include, among other things, one or more fiber spans. The process 80 also includes the step of determining if re-calibration of the at least one component of the OMS is needed, as indicated in the decision block 84.

The need to re-calibrate may be manually triggered or can be automated based on user-defined criteria. Since the procedure may impact traffic, an alarm can be raised against the OMS or against an OTS or span when a re-calibration process is required. Such alarm or indication can be further synchronized to switch away Layer 1 traffic to avoid traffic impact, where the Layer 0 photonic services can stay.

If it is determined in block 84 that re-calibration is not needed, the state of the at least one component of the in-service OMS continues to be analyzed (block 82). When re-calibration is needed, the process 80 proceeds to block 86. For example, decision block 84 may include determining whether or not any action or state is detected that would warrant re-calibration, such as when a fiber span or line system (e.g., links 48, 52, 56) is repaired or fixed or when a fiber of the fiber span or line system is replaced with one or more fibers having a different type than the previous (or original) fibers. Re-calibration may also be needed following the replacement of a line-card that may include one or more components of the OMS 26, such as a Wavelength Selective Switch (WSS), amplifiers 46, 50, 54, 58, Raman amplifier (e.g., post-amplifier 46), Variable Optical Attenuators (VOAs) or other actuators associated with the amplifiers, or other components of the line system. Also, decision block 84 may also determine that re-calibration may be needed as a result of a node reconfiguration, such as replacing a DGFF into a ROADM site, and/or other reasons.

As indicated in block 86, the process 80 of FIG. 4 further includes the step of transitioning the OMS from an in-service mode to a maintenance mode to prepare the OMS for re-calibration. For example, an "in-service mode" may refer to a regular operating condition where the OMS is configured to propagate data traffic signals to allow services to be conducted. A "maintenance mode" may refer to a condition where the OMS is temporarily taken out of service to enable changes (re-calibration) to be made in the OMS. The step associated with block 86 may be referred to as a re-calibration preparation step and may include the process described in more detail below with respect to FIG. 5. The general process 80 further includes the step of performing a re-calibration procedure, as indicated in block 88. Furthermore, the re-calibration procedure described with respect to block 88 may be executed according to the description of FIGS. 7-9. After the re-calibration procedure is performed, the general process 80 also includes the step of transitioning the OMS from the maintenance mode back to the in-service mode, as indicated in block 90. The step associated with block 90 may be referred to as a re-employment procedure step and may include the process described in more detail below with respect to FIG. 10.

Figure 5:
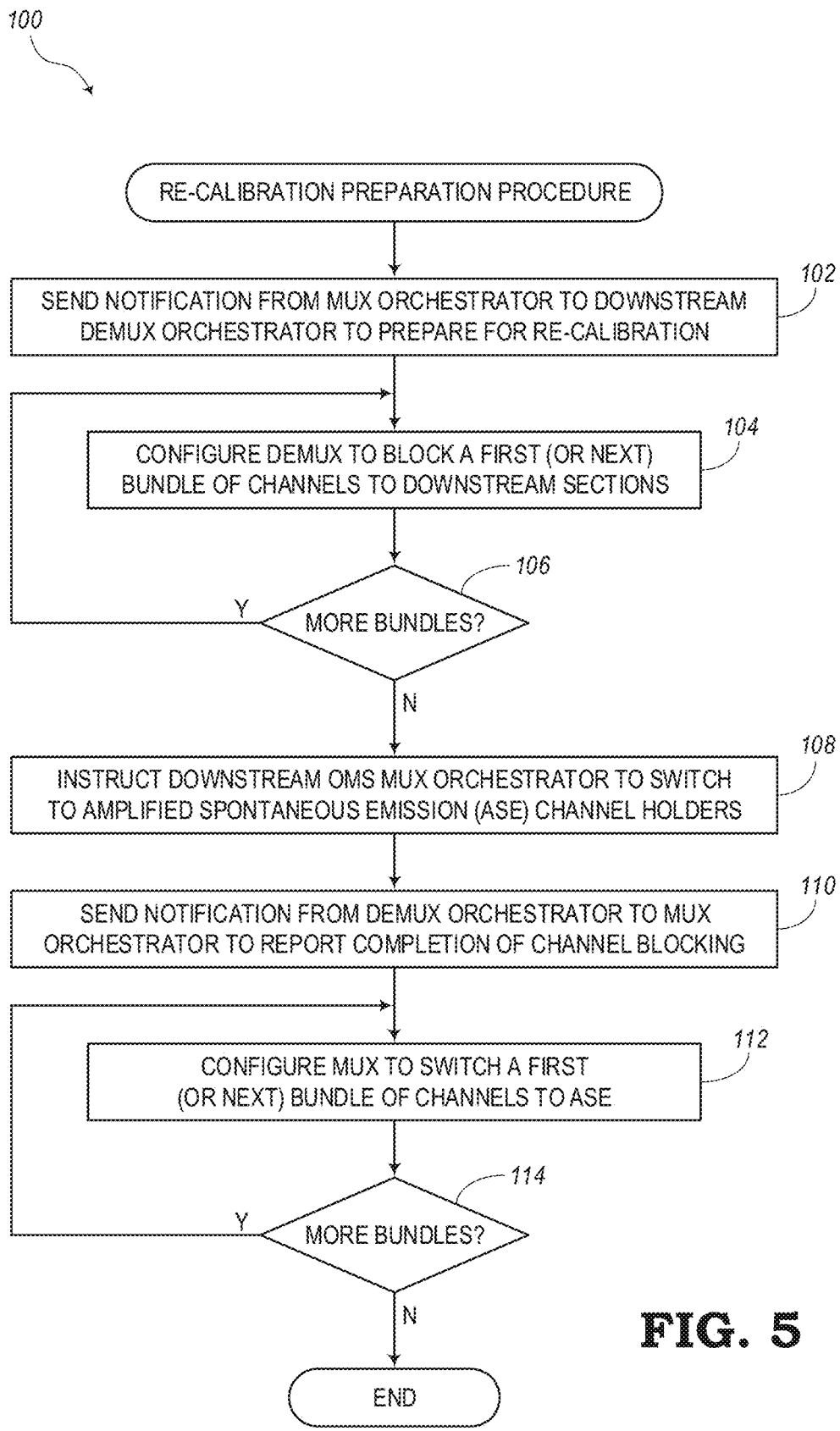
FIG. 5 is a flow diagram showing a process for performing a re-calibration preparation procedure for changing or transitioning the OMS from an in-service mode to a maintenance mode to allow for re-calibration in the OMS without significantly impacting downstream traffic, according to various embodiments.

FIG. 5 is a flow diagram showing an embodiment of a process 100 for performing a re-calibration preparation procedure for changing or transitioning the OMS from an in-service mode to a maintenance mode to allow for re-calibration in the OMS without significantly impacting downstream traffic. The process 100 includes the step of sending a notification from a multiplexer orchestrator to a downstream demultiplexer orchestrator to prepare the OMS for re-calibration, as indicated in block 102. The process 100 also includes the step of configuring the demux to block a first bundle of channels to downstream sections, as indicated in block 104. Decision block 106 includes determining whether there are more bundles of channels to block. If so, the process 100 loops back to block 104 to further configure the demux to block the next bundle of channels. When there are no more bundles to block, the process 100 proceeds from decision block 106 to block 108.

As indicated in block 108, the process 100 includes instructing one or more downstream OMS mux orchestrators to switch to their own respective ASE channel holders. Also, process 100 includes sending a notification from the demux orchestrator to the mux orchestrator to report that the demux has completed the channel blocking steps, as indicated in block 110. Then, the process 100 includes configuring the mux to switch a first bundle of channels from traffic-carrying channels to ASE channel holders, as indicated in block 112. Decision block 114 includes the step of determining whether or not there are any additional bundles of channels to switch to ASE. If so, the process 100 loops back to block 112 to switch a next bundle of channels to ASE. When it is determined in decision block 114 that there are no more bundles to switch, the re-calibration preparation procedure (i.e., process 100) ends.

The strategy of bundling channels may be described as follows. A line system may be configured as being ASE loaded that will start from a "full-fill" condition. A channel added is an ASE swap process. However, it is beneficial to remove a little bit of the ASE filler channels at a time. One goal of bundling may be to limit the amount of power being swapped at any one time so as not to cause large SRS changes. Another goal of bundling may be to spread the changes across the spectrum so as not to cause effects like Spectral Hole Burning (SHB). Also, another goal may be to perform a bundling process at the NMC level so that large multi NMC/MC cases can be handled.

FIGS. 6A-6G are diagrams illustrating various embodiments of bundling channels of a spectrum and bin assignments. According to various embodiments, bundling algorithms or strategies may be configured to virtually split the spectrum into several interleaved "combs." The locations of the channels to be added may be compared to the tines of multiple combs. The channels may be assigned to one of the "combs" based on which one is closest to the center, which may not matter in a channel that spans multiple bins. A particular added channel will not be split into multiple bundles. Also, it may be given that the number of bundles is not greater than the number of channels being added. The bin size for the combs may be arbitrary and may only be used for dividing up the channels to be added.

Figure 6A:
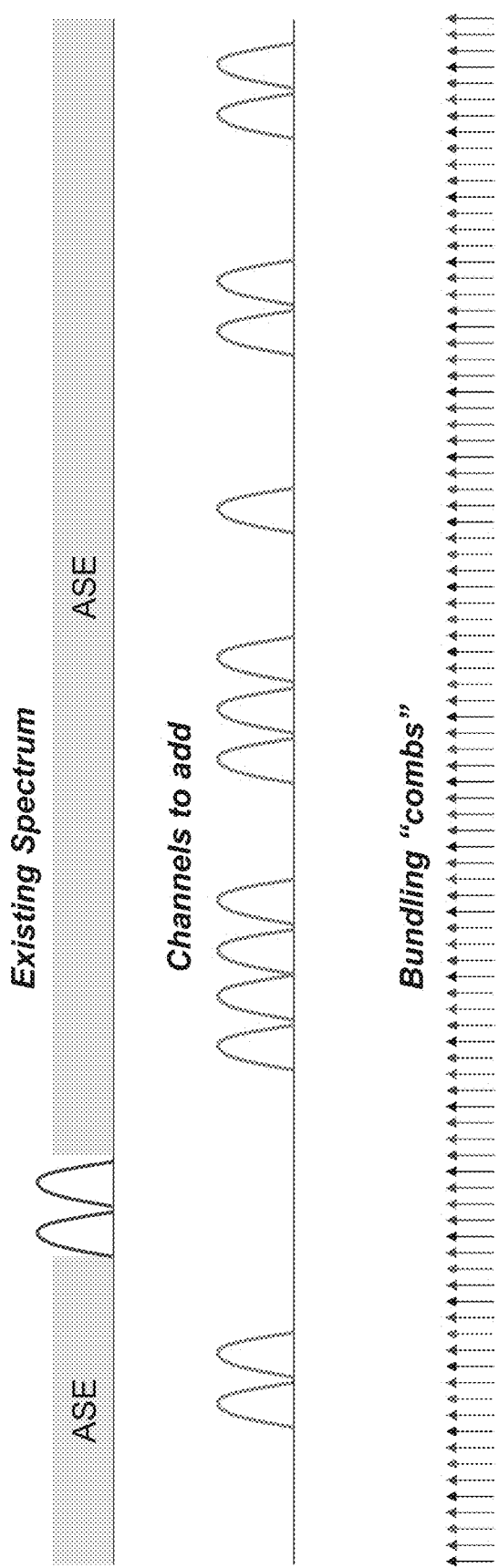
Figure 6B:
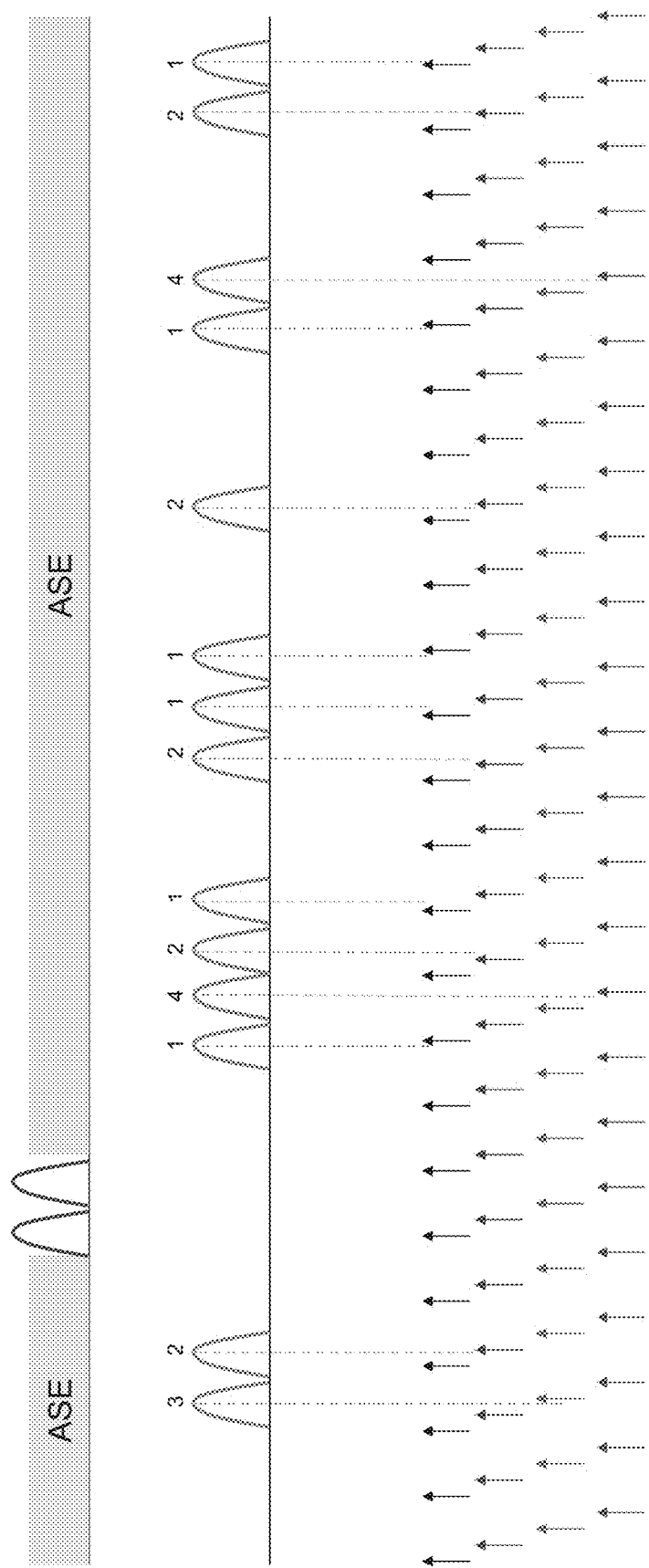

In each of FIGS. 6A-6F, the top row is an indication of the existing spectrum and the second row from the top is an indication of the channels to be added. FIG. 6A shows a third row of bundling combs. In this example, there are four different combs. FIG. 6B shows the four different combs divided out into different rows, each comb having a number of tines evenly spaced from one another.

Figure 6C:
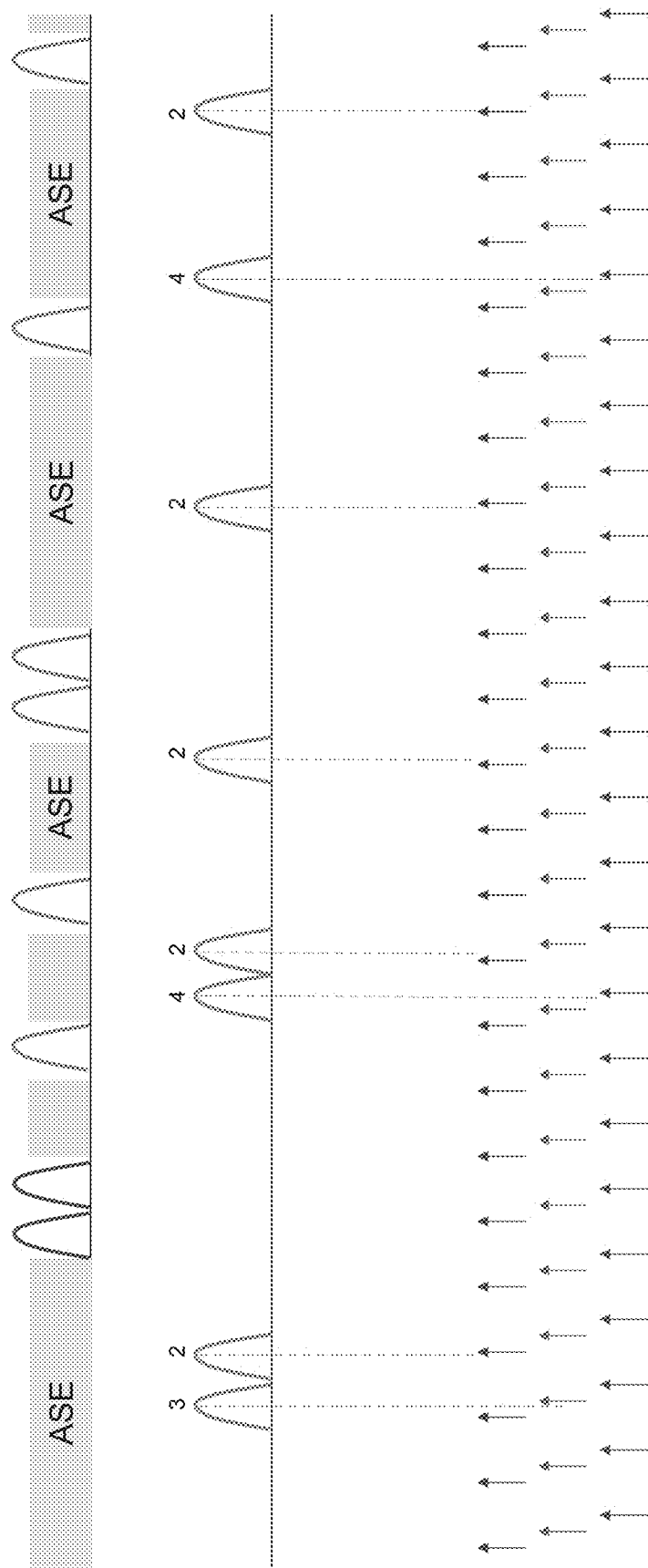

In a first step, the channels are analyzed to determine which comb includes a tine that most closely matches the center of that channel. The numbers 1-4 indicated next to each channel indicates the comb that comes closest to its center. For example, the channels indicated with a "1" correspond to the first comb of the four combs, the channels indicated with a "2" correspond to the second comb, and so on. Starting with the channels corresponding to a first comb (i.e., those channels with a "1" indicator), those channels are added to the existing spectrum, as indicated in FIG. 6C.

Figure 6D:
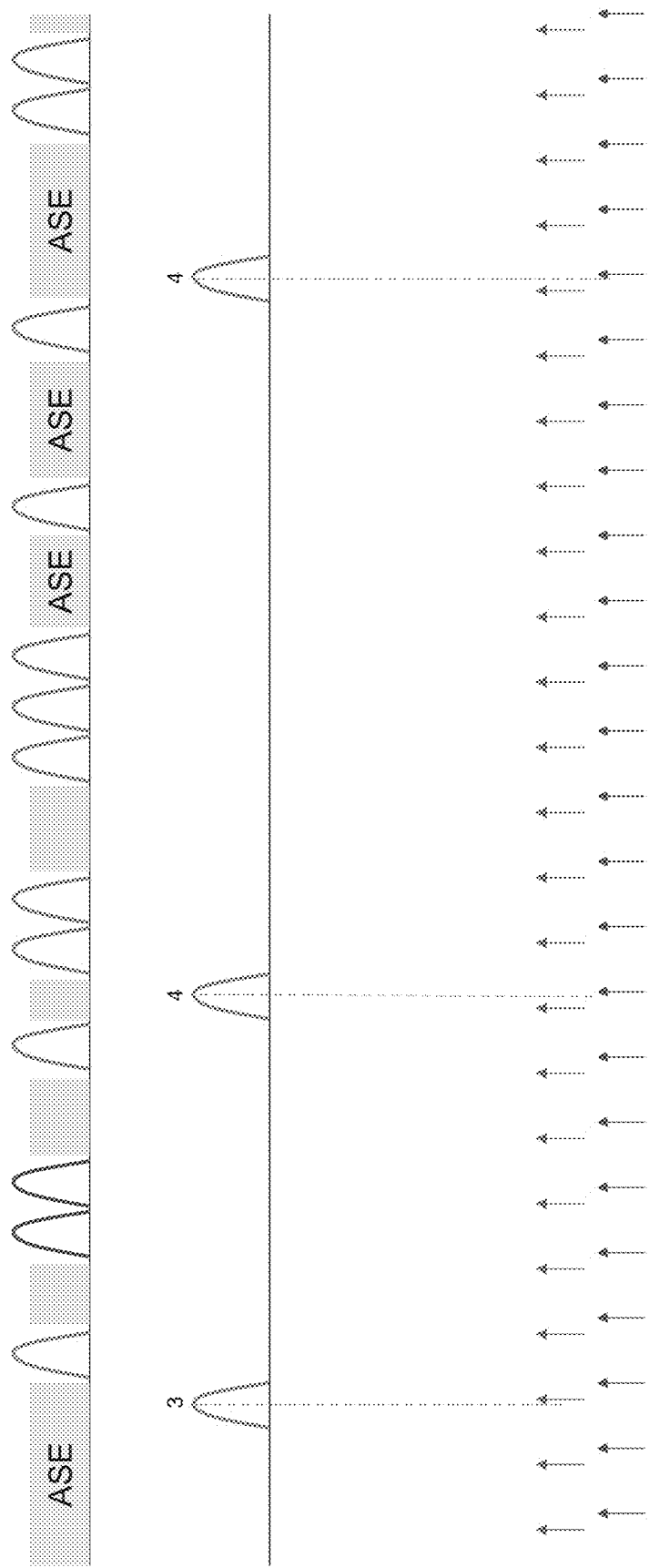
Figure 6F:
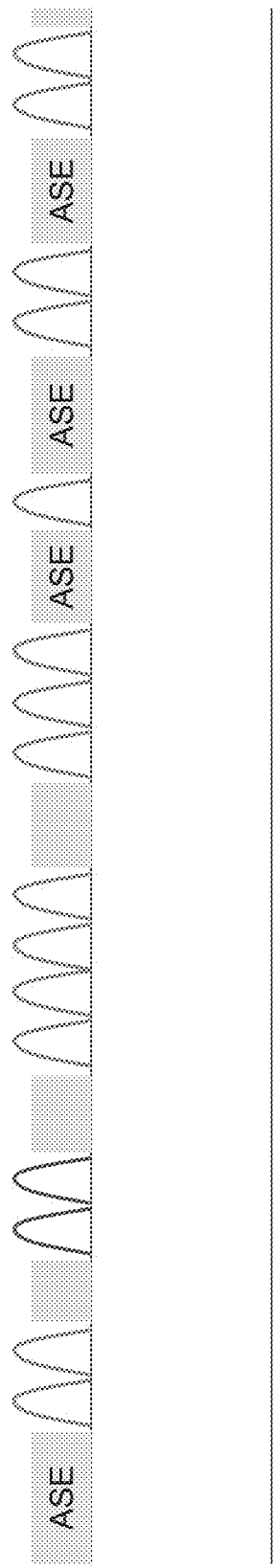

At this point, the process may move on to the next (i.e., second) comb. The channels corresponding to the second comb are then added to the existing spectrum, as shown in FIG. 6D. Then, the third comb is used to add the channels centered at the tines of the third comb, which results in the spectrum shown in FIG. 6E. Finally, the fourth comb is used to add the last channels (i.e., marked by "4") into the existing spectrum, as shown in FIG. 6F. In this way, the channels are added a little bit at a time. Also, because of the spacing between the tines of each comb, the added channels in each step are added in a spaced-apart manner.

In an optical line system that includes only C-band optical signals, the C-band may be split into four combs, as described above with respect to FIGS. 6A-6F. The bundling process may be configured to occur only on the multiplexers of the optical line system and may proceed sequentially. In some embodiments, the channels may be added in sequential steps that are about 2.0 seconds apart. In other embodiments, the channels may be added in sequential steps that are about 0.5 seconds apart.

In an optical line system that include both C-band and L-band optical signals (e.g., a C+L-band system), the C-band may be split into 12 bundle corresponding to 12 different combs. This arrangement may be the case since L-band is very sensitive to perturbations in the C-band. Twelve combs may be used in this configuration irrespective of whether the L-band includes only ASE-loaded channel holders or if the L-band is also configured to carry data traffic.

According to some embodiments, it may be safest to assume the worst case number of bundles. For example, with four combs, instead of being associated with four separate bundles, the channels could potentially end up being associated with one single bundle. Of course, it would be preferable if adjacent channels were attributed to different bundles.

Figure 6G:
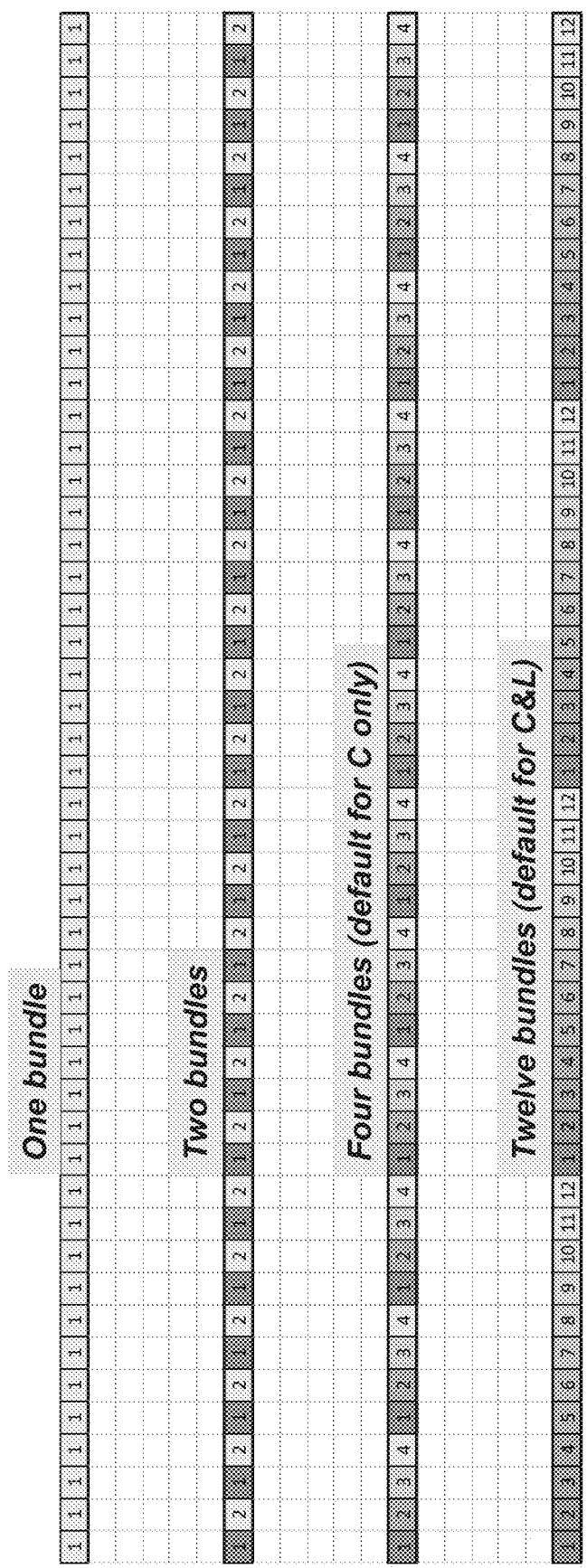

FIG. 6G is a graph showing bin assignment based on four different scenarios. The first scenario shows the bin assignment when there is one bundle. The second scenario shows the bin assignment when there are two bundles. The third scenario shows the bin assignment when there are four bundles, which may be one of the default arrangements for systems operating only with C-band spectrum. The fourth scenario shows the bin assignment when there are twelve bundles, which may be one of the default arrangements for systems operating with C+L-band spectrum. The full spectrum may be split into a fixed number of bins. The different bundle counts change the allocation of each bin to a specific bundle or comb.

Other bundling strategies may be used for bundling channels as described in the present disclosure. For example, bundling may also or alternatively include the strategies described in U.S. patent application Ser. No. 16/378,830, now U.S. Pat. No. 10,680,737, and U.S. patent application Ser. No. 16/837,057, now U.S. Pat. No. 10,784,981, each of which has the same Assignee as the present application.

Figure 7:
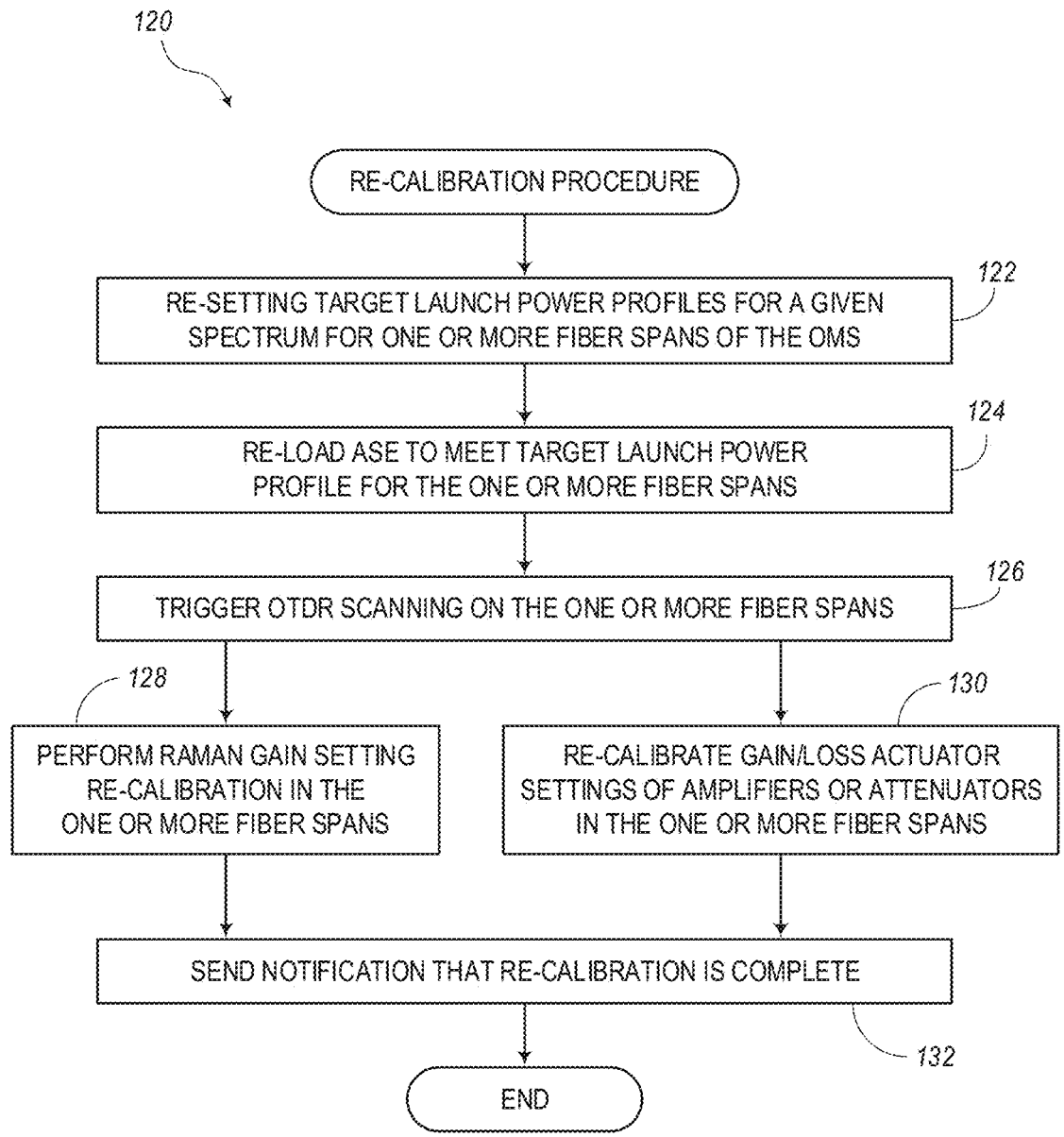
FIG. 7 is a flow diagram showing a process for performing a re-calibration procedure, according to various embodiments.

FIG. 7 is a flow diagram showing an embodiment of a process 120 for performing a re-calibration procedure. In this embodiment, the process 120 includes the step of re-setting target launch power profiles for a given spectrum (e.g., MC 70) for one or more fiber spans (e.g., links 48, 52, 56) of the OMS, as indicated in block 122. The profile re-setting progression of block 122 may be implemented in a number of different ways, such as the processes described below with respect to FIGS. 8 and 9. The process 120 also includes the step of re-loading ASE to meet the target launch power profile for the one or more fiber spans, as indicated in block 124. In some cases, re-loading the ASE may be include loading the ASE as it was originally or previously configured. Also, process 120 includes triggering an Optical Time Domain Reflectometry (OTDR) scanning procedure on the fiber span to determine power profiles of the fiber span, as indicated in block 126.

The process 120 also includes performing one or both processes described with respect to blocks 128 and 130. For example, the process 120 may include performing a Raman gain setting re-calibration in the one or more fiber spans, as indicated in block 128, for setting the gain of a Raman amplifier (e.g., post-amplifier 46) in the one or more fiber spans. As indicated in block 130, the process 120 may also or alternatively include the step of re-calibrating the gain/loss actuator settings of amplifiers (e.g., amplifiers 46, 50, 54, 58) or attenuators in the one or more fiber spans or links 48, 52, 56. Also, as indicated in block 132, the process 120 includes the step of sending a notification to the orchestrator 10 that the re-calibration procedure is complete, which thereby ends the process 120.

Figure 8:
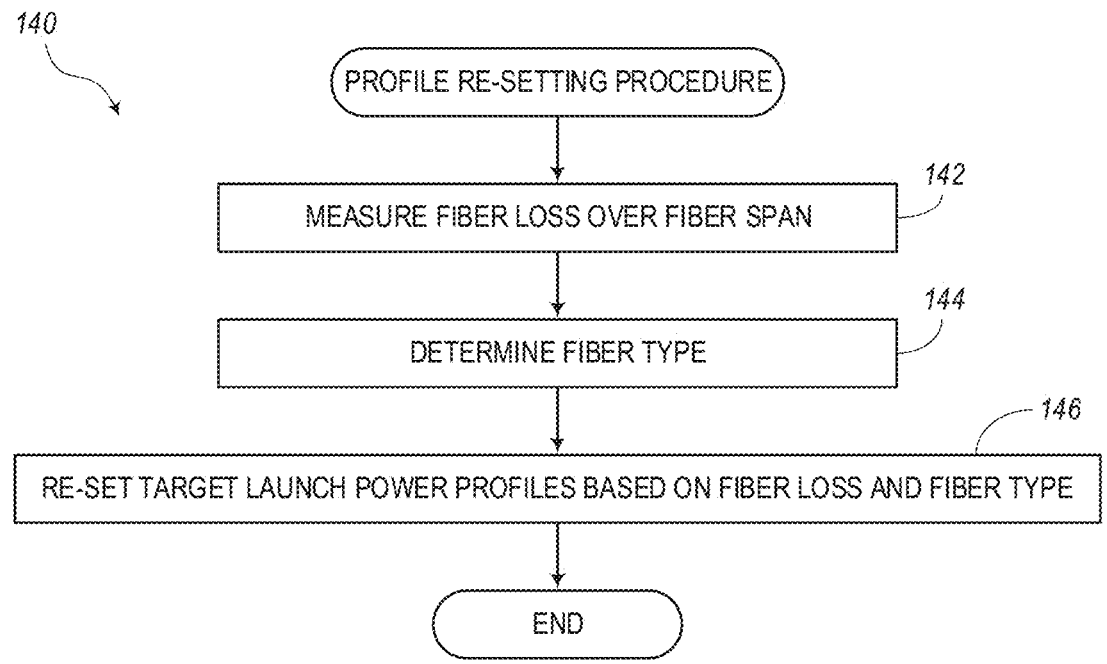
FIG. 8 is a flow diagram illustrating a first sub-routine for performing a profile re-setting procedure to re-set the target launch power profiles, according to various embodiments.

FIG. 8 is a flow diagram illustrating a first embodiment of a sub-routine 140 for performing a profile re-setting procedure to re-set the target launch power profiles as described with respect to block 122 shown in FIG. 7. In this embodiment, the sub-routine 140 includes the step of measuring a fiber loss over each of the respective fiber spans, as indicated in block 142. The sub-routine 140 also includes the step of determining the fiber type of each of the respective fibers in the one or more fiber spans, as indicated in block 144. Then, the sub-routine 140 is configured to re-set the target launch power profiles based on the fiber loss and fiber type.

Figure 9:
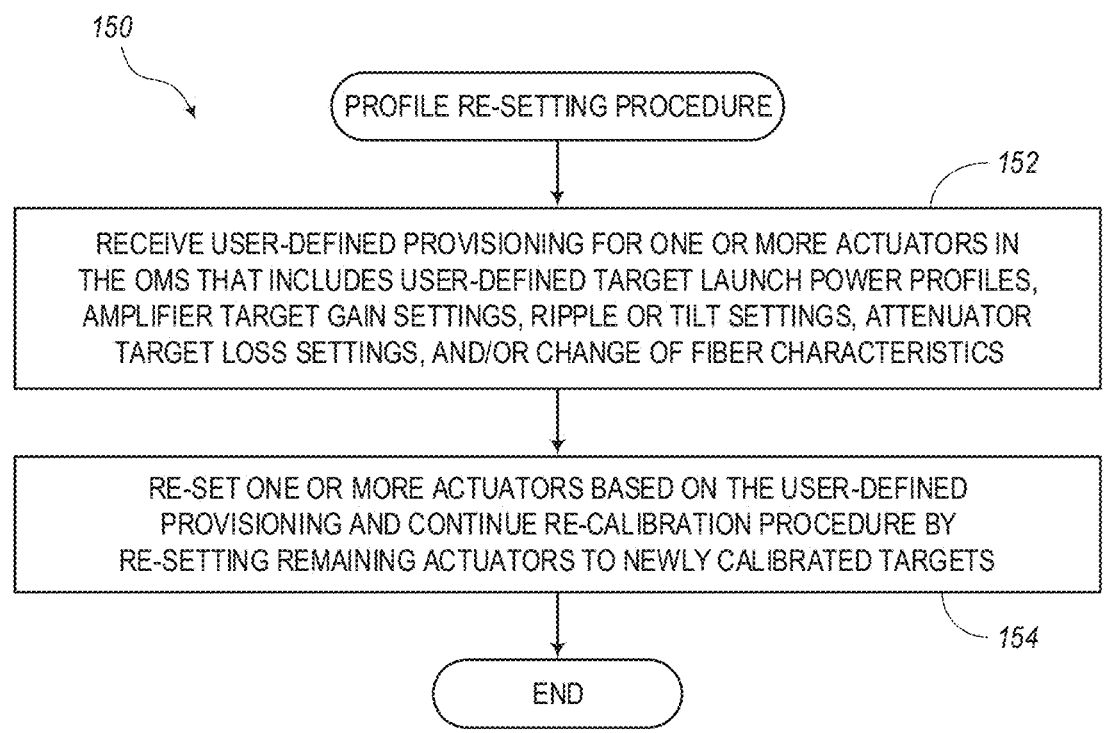
FIG. 9 is a flow diagram illustrating a second sub-routine for performing a profile re-setting procedure to re-set the target launch power profiles, according to various embodiments.

FIG. 9 is a flow diagram illustrating a second embodiment of a sub-routine 150 for performing a profile re-setting procedure to re-set the target launch power profiles as described with respect to block 122 shown in FIG. 7. In this second embodiment, the sub-routine 150 includes the step of receiving user-defined provisioning for one or more actuators in the OMS that includes user-defined target launch power profiles, amplifier target gain settings, ripple and/or tilt settings, attenuator target loss settings, and/or other change of fiber characteristics, as indicated in block 152. The user-defined provisioning may be based on the various types of optical amplifiers being characterized (e.g., Raman amplifiers, EDFA amplifiers, etc.) A combination of target launch power profiles may be user-defined settings that include gain, tilt, and ripple. Also, changing or characterizing the fiber types (and/or changing fiber type characteristics) may include distinguishing between ingress fiber types versus egress fiber types for a given span. For example, two or more different types of fibers of the same span may be spliced together. Then, as indicated in block 154, the sub-routine 150 includes re-setting one or more actuators based on the user-defined provisioning and continue re-calibration procedure by re-setting any remaining actuators to newly calibrated targets that may be obtained based on the user-defined provisioning from block 152.

Figure 10:
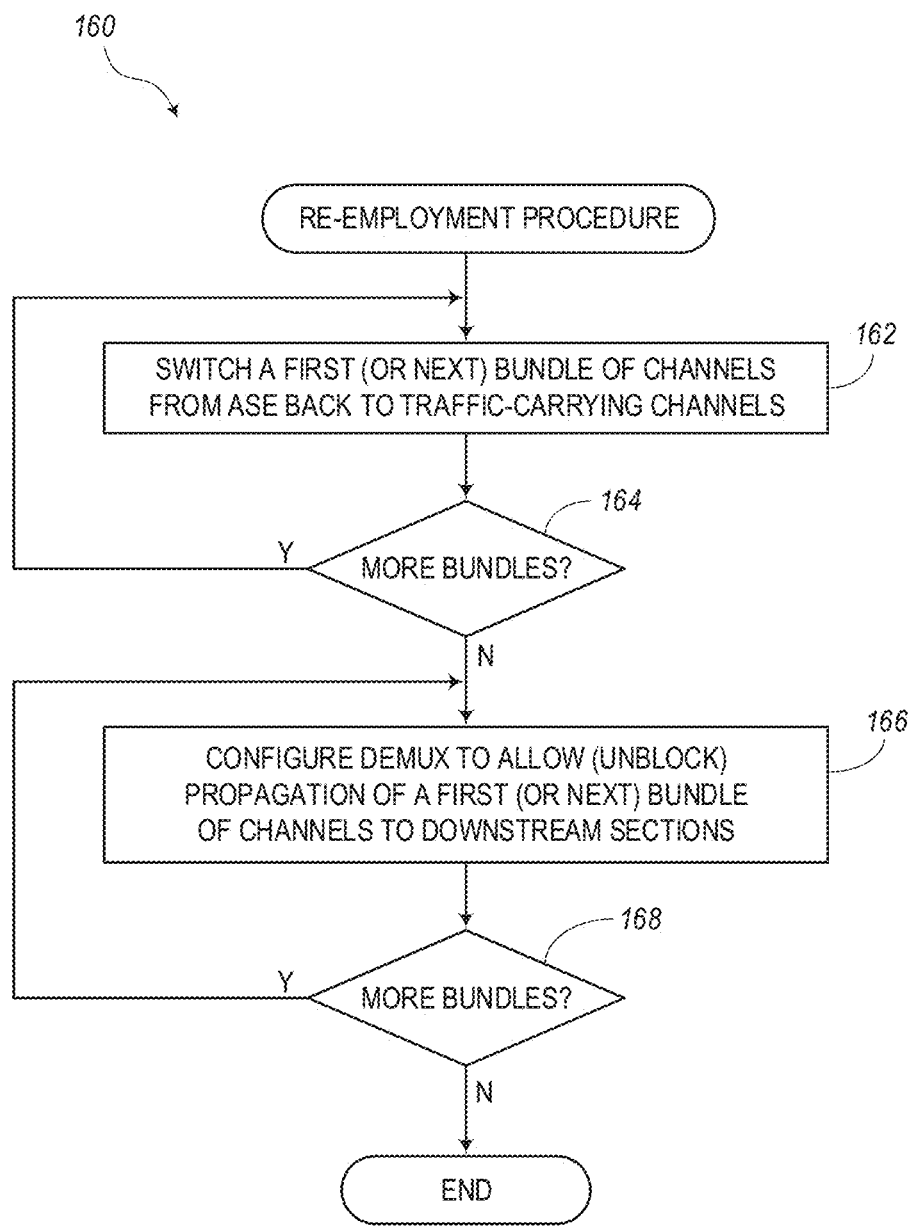
FIG. 10 is a flow diagram illustrating a process for performing a re-employment procedure, which may include the step of transitioning the OMS from the maintenance mode back to the in-service mode, according to various embodiments.

FIG. 10 is a flow diagram illustrating an embodiment of a process 160 for performing a re-employment procedure, which may include the step of transitioning the OMS from the maintenance mode back to the in-service mode, as described above with respect to block 90 shown in FIG. 4. In this embodiment, the process 160 includes block 162, which describes a step to be implemented in the section mux (e.g., multiplexer 44) in which a first bundle of channels is switched from ASE back to traffic-carrying channels. In decision block 164, it is determined whether or not there are more bundles to be switched back. If so, the process 160 loops back to block 162 for switching the next bundle of channels from ASE back to traffic-carrying channels. When there are no more bundles of channels to switch, the process 160 moves ahead to block 166.

As indicated in block 166, the process 160 includes the step of configuring the demux to allow propagation of a first bundle of channels to downstream sections. In other words, the demux, which was blocked in a previous step from propagating light to downstream sections, is unblocked at this step to enable propagation of the first bundle of channels to continue. Decision block 168 includes the step of determining whether or not there are additional bundles of channels to be unblocked by the demux. If so, the process 160 loops back to block 166 to configure the demux to allow the next bundle of channels to be propagated to downstream section. When there are no more bundles to unblock, the process 160 comes to an end, which may also correspond to the end of the process 80 of FIG. 4.

The systems and methods of the present disclosure are configured to coordinate re-calibration processes between the section mux to the section demux. Also, according to some embodiments, the re-calibration processes do not require a user to de-provision existing channels.

At the start of the re-calibration process, the re-calibration program 24 is configured to enable the processing device 12 to block propagation of light going to downstream sections or being dropped to receivers. This blocks propagation of power perturbation to the downstream sections due to an upstream calibration process. Also, the process includes starting re-calibration by forcing all channels away at the section mux from traffic switch ports to an ASE source port. This switch to ASE is executed regardless of pre-defined channel provisioning. The link re-calibration process may include the re-loading of the new or previously-used ASE channel holders. Once the link is fully re-calibrated, the process also includes re-adding the traffic channels at section mux and unblocking the channels (pixels) at the far-end section demux.

The methods may further include starting the re-calibration process by blocking the channels (pixels) at the section demux in a plurality of stages where each stage include blocking one or more channels grouped in a bundle. After a first stage when a first bundle of channels is blocked, the method blocks the next bundle of channels. This gradual bundle-by-bundle blocking process may be referred to as a "graceful blocking" process. The process blocks the propagation of light to downstream sections and allows channel controllers of a downstream section (OMS) to switch away to ASE in a non-service affecting way (e.g., due to a loss of signal power). Also, the methods may include ending the re-calibration process by re-adding all channels at the section mux in a graceful re-adding process, which may include re-adding the channels bundle-by-bundle.

Use Case: Running Re-Config/Re-Calibration Operation with Channel Topology Provisioned According to one use case of the optical network 30 of FIG. 2, a user may need to run re-configuration or manual re-calibration procedures without de-provisioning and re-provisioning the channel topology of the in-service channels. In some embodiments, a node (e.g., OMS 26) may have multiple downstream degrees. In this case, an application configured to perform management, control, and planning operations may be used to coordinate the re-calibration. For example, this application may include software (e.g., stored in the memory device 14) that converges the complete network operations lifecycle through network planning, infrastructure commissioning, service fulfillment, and service assurance. The application may enable multi-layer packet and optical service management and network optimization. Furthermore, it may provide a real-time, accurate view of the network and service topology to integrate equipment network capacity demand planning with optimal efficiency.

The application may delete the channels optically without de-provisioning the channel topology (e.g., MC, NMCs, cross-connects, etc.). In some embodiments, no sequencing or high layer bundling would be required for reconfigurable homogenous solutions. This may be done in each downstream domain where a channel is coming from an upstream domain that has manual re-calibration. In this case, channels may be optically deleted on the immediate (e.g., adjacent) downstream domain and there would normally be no need for an end-to-end deletion. At this point, the application may perform re-configuration and manual re-calibration processes. Once done, the channels may be optically re-added.

The application may be stored as software in the memory device 14 of the orchestrator 10 or in other controller or orchestrator devices. The software specification may allow a user to be able to de-activate and re-activate a Media Channel (e.g., MC 70). In other words, all NMCs within the MC could be de-activated and re-activated optically without de-provisioning the cross-connects. For a delete request, the local mux (e.g., multiplexer 44) may apply the bundling strategy to switch to ASE channel holders from the ASE source. Following deletion, the channel spectrum could switch to ASE at the local mux and the channels (pixels) may be shut down at the far-end demux regardless of channel topology provisioning. In this embodiment, the far-end demux does not get closed until the local mux is done with the entire bundling process to switch the channels to ASE. With a channel re-adding step, the bundling may be applied again on the local mux and the far-end demux channels (pixels) will open to allow propagation, in which case there is no bunding for the demux re-starting.

Conventional systems do not attempt to "re-calibrate" an already-calibrated optical system or OMS having an ASE-loaded spectrum. However, the embodiments of the present disclosure provide systems and methods to perform re-calibration, as needed, to re-set various settings and parameters of multiplexer, demultiplexers, amplifiers, and other components of the OMS. Thus, with the present embodiments, it is possible to isolate the impact of link re-calibration processes for a section (OMS) to in-service channels in downstream sections by blocking light at the demultiplexer, which may be done in bundles. Also, some of the embodiments described herein may eliminate the need for channel de-provisioning and re-provisioning at re-calibration, and hence, may reduce the maintenance window in a busy network configuration. Furthermore, embodiments may be further configured to enable a bi-directional link calibration process. The bi-directional process may initiate re-calibration in one direction, which may then trigger another re-calibration process in the reverse direction as well.

Some embodiments may include blocking the propagation of light by notifying all downstream section multiplexers to switch away from traffic for a given set of affected channels. The method of re-calibration may further include re-calibrating target launch power profiles for the given spectrum to the fiber, re-loading ASE to meet the target launch profile to fiber, triggering OTDR scanning at each span, running Raman gain calibration for each span, and re-setting any gain/loss actuators in each span to ensure the target profile is met.

As part of the re-calibration strategy, the processes can reset target profiles based on the measured fiber loss and fiber type, or it can respect a user-provisioned target launch profile setting. The processes can also maintain a user-provisioned actuator setting for one or more explicit actuators (e.g., Raman gain or EDFA target gain) on any span and continue a calibration process for the remaining of the actuators by resetting them to their newly calibrated targets. The re-calibration processes may be uni-directional (as described with respect to FIG. 2), whereby traffic on the reverse direction is not impacted. However, in other embodiments, the processes can be enhanced by enabling bi-directional re-calibration, whereby re-calibrating from a first-end OMS mux also triggers re-calibration process from the far-end in the reverse direction by using a similar communication mechanism between two OMS mux nodes at the local end and far end, as described in more detail below with respect to FIG. 11.

Bi-Directional Link Re-Calibration

Figure 11:
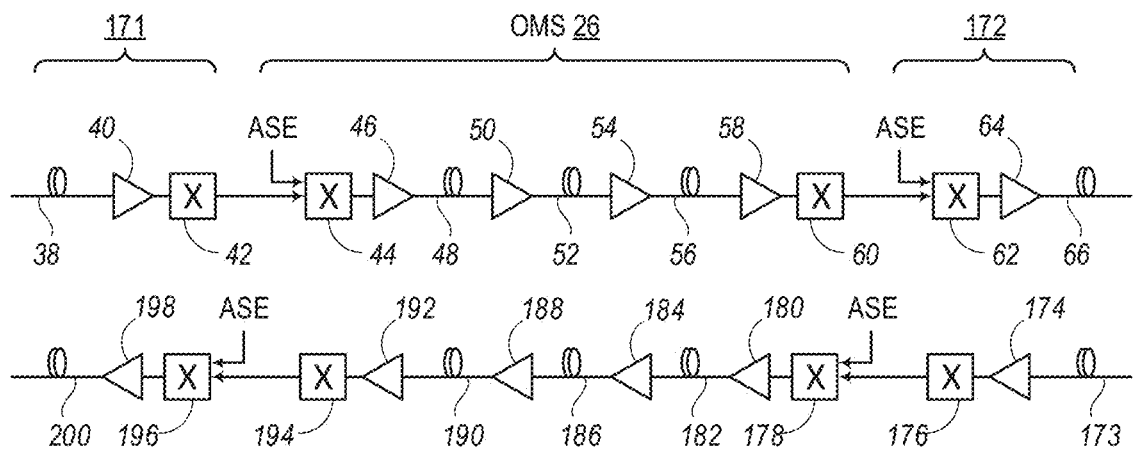
FIG. 11 is a diagram showing a portion of another optical network, similar to the optical network of FIG. 2, according to various embodiments.

FIG. 11 is a diagram showing a portion of an optical network 170, similar to the optical network 30 described with respect to FIG. 2. In this embodiment, the OMS 26, which may be controlled by the OMS orchestrator 10 of FIG. 1, is arranged between a first neighboring section 171 (e.g., similar to the upstream section 32 shown in FIG. 2) and a second neighboring section 172 (e.g., similar to the downstream section 34). The first and second neighboring sections 171, 172 may be portions of adjacent OMSs, Intermediate Line Amplifiers (ILAs), network elements, nodes, or other components of the optical network. Traffic signals may be propagated through the OMS 26 in both directions. That is, traffic may propagate a first direction from the first neighboring section 171 to the second neighboring section 172 and in a second direction from the second neighboring section 172 to the first neighboring section 171, whereby channels may be added and/or dropped by one or more multiplexers and demultiplexers.

As shown in FIG. 11 (and similar to FIG. 2), the first neighboring section 171 of the optical network 170 may include the upstream link 38, the pre-amplifier 40, and the demultiplexer 42 that provides demultiplexed signals to the OMS 26. Also, similar to FIG. 2, the OMS 26 may include the multiplexer 44, the post-amplifier 46, the first link 48, the first ILA 50, the second link 52, the second ILA 54, the third link 56, the pre-amplifier 58, and the demultiplexer 60. The demultiplexer 60 of the OMS 26 provides demultiplexed signals to the second neighboring section 172, which may include the multiplexer 62, the post-amplifier 64, and the downstream link 66.

In the bi-directional embodiment shown in FIG. 11, the optical network 170 further includes a fiber span (e.g., optical line system) for allowing the OMS 26 to propagate signal in the reverse direction (i.e., from the second neighboring section 172 to the first neighboring section 171). The reverse-direction portion of the optical network 170 may include an upstream link 173, a pre-amplifier 174, and a demultiplexer 176 of the second neighboring section 172. The demultiplexer 176 may be configured to provide demultiplexed signals to the OMS 26. In this embodiment, the OMS 26 may include a multiplexer 178, a post-amplifier 180, a first link 182, a first ILA 184, a second link 186, a second ILA 188, a third link 190, a pre-amplifier 192, and a demultiplexer 194. The demultiplexer 194 of the OMS 26 provides demultiplexed signals to the first neighboring section 171, which may include a multiplexer 196, a post-amplifier 198, and a downstream link 200.

In the optical network, multiple orchestrators (e.g., each one similar to the orchestrator 10 of FIG. 1) may be used to control individual components of the OMS 26. For example, a first orchestrator may be used to control the multiplexer 44 at a first end (local end) adjacent to the first neighboring section 171. A second orchestrator may be used to control the demultiplexer 60 at the other end (far end) adjacent to the second neighboring section 172. A third orchestrator may be used to control the multiplexer 178 at the far end adjacent to the second neighboring section 172. Also, a fourth orchestrator may be used to control the demultiplexer 194 at the first end (local end) adjacent to the first neighboring section 171. The third and fourth orchestrators in this example may be referred to as reverse-direction orchestrator for controlling the fiber span in the reverse direction from the second neighboring section 172 to the first neighboring section 171. The orchestration operations of the separate orchestrators are described below with respect to FIG. 12.

Figure 12:
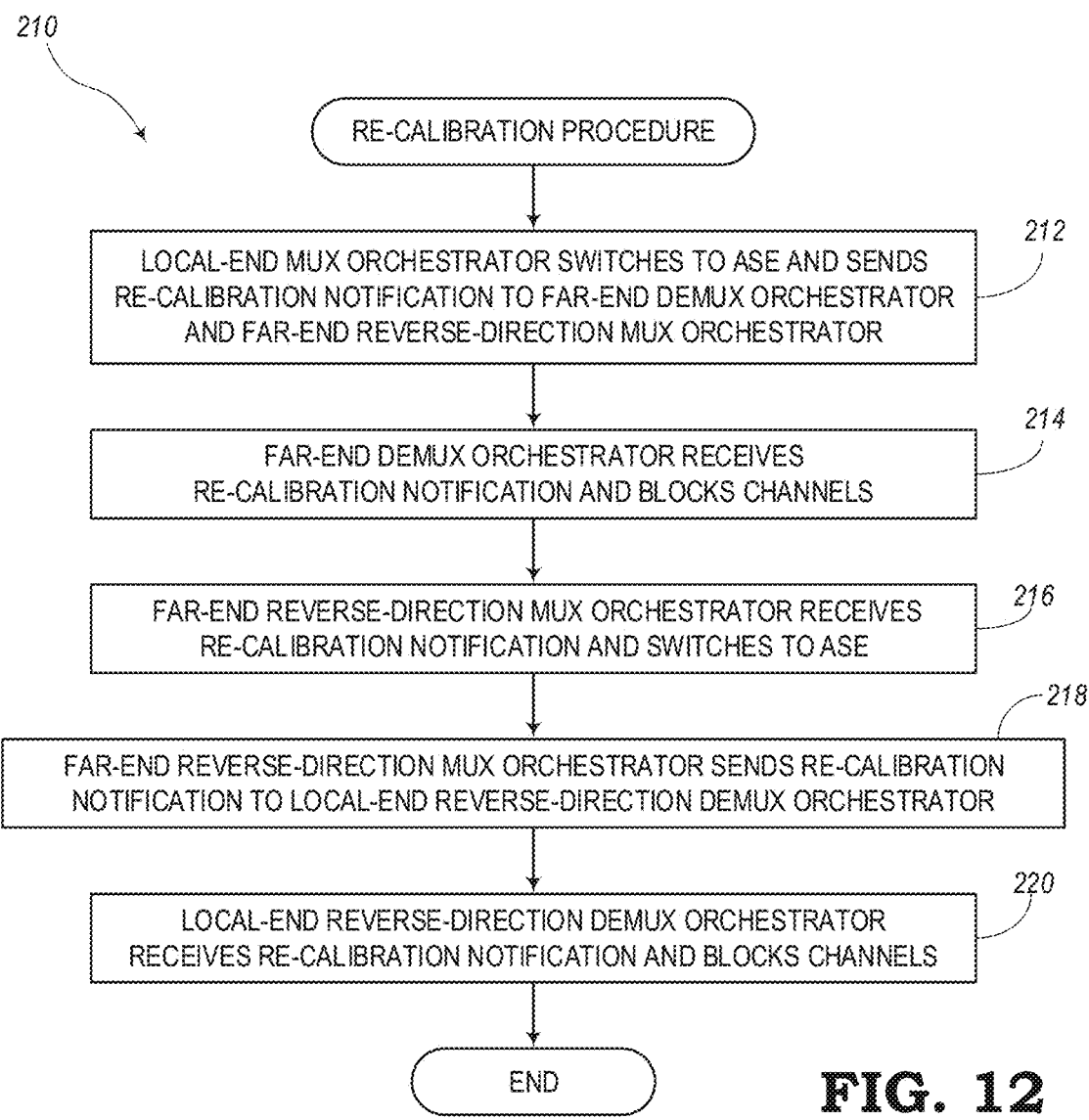
FIG. 12 is a flow diagram illustrating a process for performing re-calibration in bi-directional fiber spans of the optical network of FIG. 11, according to various embodiments.

FIG. 12 is a flow diagram illustrating an embodiment of a process 210 for performing re-calibration in bi-directional fiber spans of the OMS 26. In this embodiment, the process 210 includes a step of enabling a local-end mux orchestrator (e.g., associated with the multiplexer 44) to switch to ASE, as indicated in block 212. Also, block 212 includes sending a re-calibration notification from the local-end mux orchestrator to a far-end demux orchestrator and a far-end reverse-direction mux orchestrator.

As indicated in block 214, the process 210 further includes the step of allowing the far-end orchestrator to receive the re-calibration notification and block the channels at the far-end demux 60 to prevent in-service channels from being supplied to the second neighboring section 172. The far-end reverse-direction mux orchestrator and receives the re-calibration notification and proceeds to switch in the ASE to replace the traffic-carrying channels, as indicated in block 216. The process 210 also includes enabling the far-end reverse-direction mux orchestrator to send another re-calibration notification to a local-end reverse-direction demux orchestrator associated with the demultiplexer 194, as indicated in block 218. As indicated in block 220, the local-end reverse-direction demux orchestrator receives this second re-calibration notification and proceeds to block channels to prevent in-service channels from being supplied to the first neighboring section 171.

Some additional features of the various implementations described in the present disclosure may include providing an ASE-filled optical link that supports some level of automatic calibration or re-calibration requests. The systems may ensure that the fiber link contains some in-service already-provisioned channels. The systems also include sending a request for re-calibration of the link. Also, the systems of the present disclosure may be identified by a strategy whereby downstream demux pixels (channels) may be automatically blocked and traffic at the mux may be switched to an ASE source for calibration purposes. The present systems and methods may also allow the initiation of reverse direction calibration while an original request for re-calibration is made for the other direction.

Automatic link calibration processes may be part of existing line systems. However, the present disclosure provides additional re-calibration while the previous calibration system is in operation. This re-calibration may be applied on ASE-loaded optical links for photonic control solutions. In such ASE-loaded links, re-calibration of the link may be useful in certain field operation use cases. One benefit is that there may be a high demand from customers to allow these new operations of re-calibration as described herein. The systems and methods may allow customers to complete re-calibration processes in a maintenance window that will automatically isolate the impact only for that immediate section (e.g., OMS 26) where the re-calibration takes place. This can be done without significant impact on downstream sections and without oversight from a network operator to conduct tasks for customers to isolate the impact in an ASE-loaded system.

The re-calibration strategies of the present disclosure may be implemented during the lifetime of an optical system that has been deployed, put into service, and calibrated with pre-set or customized settings as need to allow the optical system to operate in an optimal manner. However, from time to time, re-calibration may be needed to allow the optical system to continue operating in an efficient manner when certain changes are made during the lifetime of the optical system. For example, if a network operator performs a re-configuration of the optical system, it may also be important to perform one or more of the re-calibration processes discussed in the present disclosure. If, during maintenance of the optical system, there is a change in the fiber type of a fiber span, re-calibration may be needed. Other reasons for re-calibration are mentioned throughout the present disclosure.

Re-calibration processes may include reloading the ASE and re-calibrating the Raman amplifier settings. The re-setting of the Raman may take longer because the system may need to look for minimum and maximum gain ranges where the power may fluctuate quite a bit. With these embodiments of re-calibration, it is important to recognize that changes may be needed in light of a system that has already been established and may have experienced changes and repairs throughout its lifetime (e.g., similar to a brown-field scenario with existing conditions, states, etc.). With the already-deployed system, there are understandably some challenges that may need to be addressed as compared to a newly deployed system. Even though re-calibration may be performed in a maintenance window, the maintenance is executed on existing channels within a section such that the channel power downstream should be considered. Since this power will tend to fluctuate quite a bit because of turning off the Raman and re-calibrating the Raman, the processed described in the present disclosure may include graceful switching and/or shutting off to minimize the impact on downstream section.

The Raman may be switched on and off during maintenance, in addition to the EDFAs being switched on and off. The gain stages of the EDFAs of the fiber span, for example, may be significantly changed over a maintenance window. A previous low-gain style loss may not be proper with new settings and the re-calibration may include increasing (or decreasing) the gain settings of the EDFAs. These changes may normally cause drastic changes in the sections and may result in significant power fluctuations, which could impact downstream traffic. Thus, the channels are blocked by the demux in the section in order to prevent a negative impact on the traffic downstream.

The re-calibration process may include two main things. The first is that when doing a re-calibration, the demux is blocked, which can be done gracefully. It is possible to divide the channels into groups or bundles to block the channels at the demux one group or bundle at a time. This graceful blocking can be received downstream as a chance to switch a mux from regular channel traffic to ASE filler waveforms in a downstream node. The next thing is that as the demux is performing the graceful blocking of bundles, the ASE-loaded system at the local end with the mux can start switching from channel traffic to ASE channel holders bundle by bundle. The division of bundles for the blocking demux may be the same or similar division of bundles for the mux switching to ASE-loading (e.g., from a single source).

After the graceful blocking and graceful ASE substitution, the next part of the re-calibration process may include gracefully reloading the ASE and finishing the re-calibration by re-setting value or parameters for various components. Once re-calibration is complete, the demux is unblocked.

The unblocking may also be a bundle-by-bundle graceful transition or, in some embodiments, may unblock in one step since the reloading is already being done gracefully.

The re-calibration can be performed while keeping the channel topology the same. In other words, the provisioning of channels does not need to change during re-calibration. By switching/blocking a few channels at a time, it is possible to obtain a smooth spectrum profile during re-calibration. From a user's perspective, the user does not need to delete channels or redo any provisioning.

Since the embodiments described herein are performed while the OMS is in service, the OMS remains active. Although the traffic may be impacted within the OMS itself, the shutting off of demux channels will reduce or eliminate impact on other downstream traffic on downstream sections. If there are many channels coming from an upstream section and the traffic is suddenly removed, it may create a large spectrum dip and may start impacting other in-service traffic going through other routes. The traffic in those routes will be impacted if nothing is done, but the re-calibration procedures described herein are able to overcome this issue.

Therefore, according to various embodiments, the present disclosure describes various systems and methods for re-calibration in an OMS. One embodiment may include analyzing a state of at least one component of a plurality of components of an in-service Optical Multiplex Section (OMS) in an optical network, where the plurality of components may include, among other things, one or more fiber spans. Based on a need to re-calibrate the at least one component of the OMS, the OMS may be transitioned from an in-service mode to a maintenance mode to prepare the OMS for re-calibration. Then, a re-calibration procedure may be performed. In response to completing the re-calibration procedure, the OMS may be transitioned from the maintenance mode back to the in-service mode.

In this embodiment, the system or method may further be configured wherein transitioning the OMS from the in-service mode to the maintenance mode may include a step of configuring a demultiplexer of the OMS to block traffic channels within a given spectrum from being propagated to downstream sections. Configuring the demultiplexer of the OMS to block the traffic channels may include blocking the traffic channels one bundle at a time. In the absence of traffic channels within the OMS, the step of configuring the demultiplexer to block traffic channels may be omitted.

Furthermore, wherein transitioning the OMS from the in-service mode to the maintenance mode may include configuring a multiplexer of the OMS to switch traffic channels within a given spectrum to ASE filler channels. Configuring the multiplexer of the OMS to switch the traffic channels to ASE filler channels may include switching the traffic channels one bundle at a time.

These embodiments may further be configured wherein the re-calibration procedure may include re-setting target launch power profiles for a given spectrum for one or more fiber spans of the OMS. Re-setting the target launch power profiles may include measuring fiber loss or fiber length over the fiber span, determining a fiber type of the fiber span, and re-setting the target launch power profiles based on the measured fiber loss or length and the fiber type. Re-setting may further include re-setting the target launch power profiles per spectrum band, wherein the profile for one band of the spectrum is different from another band of the spectrum.

The systems or methods in these embodiments may also be defined whereby the re-calibration procedure might include re-loading Amplified Spontaneous Emission (ASE) filler channels in the given spectrum to meet the target launch power profiles for one or more fiber spans, triggering Optical Time-Domain Reflectometry (OTDR) scanning on the one or more fiber spans and performing Raman gain setting re-calibration for a Raman amplifier in the one or more fiber spans and/or re-calibrating gain/loss actuator settings of amplifiers and attenuators in the one or more fiber spans. The re-calibration procedure may include receiving user-defined provisioning for one or more actuators in the OMS that includes user-defined target launch power profiles, amplifier target gain settings, ripple or tilt settings, attenuator target loss settings, and/or change of fiber characteristics; and re-setting one or more actuators based on the user-defined provisioning and continuing the re-calibration procedure for any remaining actuators by re-setting them to newly calibrated targets. The re-calibration procedure may proceed sequentially through a node from an OMS multiplexer to an OMS demultiplexer, one component at a time.

Also, the process of transitioning the OMS from the maintenance mode back to the in-service mode may include configuring a multiplexer of the OMS to switch Amplified Spontaneous Emission (ASE) filler channels to traffic channels and configurating a demultiplexer of the OMS to unblock propagation of traffic channels to downstream sections. Switching the ASE filler channels to traffic channels may include switching to traffic channels one bundle at a time, wherein unblocking propagation of traffic channels may include unblocking the traffic channels one bundle at a time.

Performing the re-calibration procedure may include bi-directionally re-calibrating the OMS. For example, bi-directionally re-calibrating the OMS may include enabling a local-end multiplexer orchestrator to switch traffic channels to ASE filler channels. The local-end multiplexer orchestrator may be enabled to send a first re-calibration notification to a far-end demultiplexer orchestrator and a far-end reverse-direction multiplexer orchestrator. The far-end demultiplexer orchestrator may be enabled to block traffic channels upon receiving the first re-calibration notification. The far-end reverse-direction multiplexer orchestrator may be enabled to switch traffic channels to ASE filler channels upon receiving the first re-calibration notification. The far-end reverse-direction multiplexer orchestrator may be enabled to send a second re-calibration notification to a local-end reverse-direction demultiplexer orchestrator. Also, the local-end reverse-direction demultiplexer orchestrator may be enabled to block traffic channels upon receiving the second re-calibration notification.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device; and
a memory device configured to store a computer program having instructions that, when executed, enable the processing device to:

analyze a state of at least one component of an in-service Optical Multiplex Section (OMS) in an optical network;
based on a need to re-calibrate the at least one component of the OMS, transition the OMS from an in-service mode to a maintenance mode to prepare the OMS for re-calibration;
perform a re-calibration procedure; and
in response to completing the re-calibration procedure, transition the OMS from the maintenance mode back to the in-service mode,
wherein the re-calibration procedure proceeds sequentially through a node from an OMS multiplexer to an OMS demultiplexer, one component at a time.

2. The system of claim 1, wherein transitioning the OMS from the in-service mode to the maintenance mode includes configuring a multiplexer of the OMS to switch traffic channels within a given spectrum to Amplified Spontaneous Emission (ASE) filler channels.

3. The system of claim 2, wherein configuring the multiplexer of the OMS to switch the traffic channels to ASE filler channels includes switching the traffic channels one bundle at a time.

4. The system of claim 1, wherein the at least one component of the OMS includes one or more fiber spans, and wherein the re-calibration procedure includes re-setting target launch power profiles for a given spectrum for the one or more fiber spans.

5. The system of claim 4, wherein re-setting the target launch power profiles includes:
measuring fiber loss or fiber length over the one or more fiber spans;
determining a fiber type of the one or more fiber spans; and
re-setting the target launch power profiles based on the measured fiber loss or fiber length and the fiber type.

6. The system of claim 5, wherein re-setting further includes re-setting the target launch power profiles per spectrum band, and wherein the profile for one band of the spectrum is different from another band of the spectrum.

7. The system of claim 1, wherein the at least one component of the OMS includes one or more fiber spans, and wherein the re-calibration procedure includes:
re-loading Amplified Spontaneous Emission (ASE) filler channels in the given spectrum to meet the target launch power profiles for the one or more fiber spans;
triggering Optical Time-Domain Reflectometry (OTDR) scanning on the one or more fiber spans; and
performing Raman gain setting re-calibration for a Raman amplifier in the one or more fiber spans and/or re-calibrating gain/loss actuator settings of amplifiers and attenuators in the one or more fiber spans.

8. The system of claim 1, wherein transitioning the OMS from the maintenance mode back to the in-service mode includes:
configuring a multiplexer of the OMS to switch Amplified Spontaneous Emission (ASE) filler channels to traffic channels; and
configurating a demultiplexer of the OMS to unblock propagation of traffic channels to downstream sections.

9. The system of claim 8, wherein switching the ASE filler channels to traffic channels includes switching to traffic channels one bundle at a time, and wherein unblocking propagation of traffic channels include unblocking the traffic channels one bundle at a time.

10. The system of claim 1, wherein performing the re-calibration procedure includes bi-directionally re-calibrating the OMS.

11. The system of claim 10, wherein bi-directionally re-calibrating the OMS includes enabling:
a local-end multiplexer orchestrator to switch traffic channels to Amplified Spontaneous Emission (ASE) filler channels;
the local-end multiplexer orchestrator to send a first re-calibration notification to a far-end demultiplexer orchestrator and a far-end reverse-direction multiplexer orchestrator;
the far-end demultiplexer orchestrator to block traffic channels upon receiving the first re-calibration notification;
the far-end reverse-direction multiplexer orchestrator to switch traffic channels to ASE filler channels upon receiving the first re-calibration notification;
the far-end reverse-direction multiplexer orchestrator to send a second re-calibration notification to a local-end reverse-direction demultiplexer orchestrator; and
the local-end reverse-direction demultiplexer orchestrator to block traffic channels upon receiving the second re-calibration notification.

12. A system comprising:
a processing device; and
a memory device configured to store a computer program having instructions that, when executed, enable the processing device to:
analyze a state of at least one component of an in-service Optical Multiplex Section (OMS) in an optical network;
based on a need to re-calibrate the at least one component of the OMS, transition the OMS from an in-service mode to a maintenance mode to prepare the OMS for re-calibration;
perform a re-calibration procedure; and
in response to completing the re-calibration procedure, transition the OMS from the maintenance mode back to the in-service mode,
wherein transitioning the OMS from the in-service mode to the maintenance mode includes a step of configuring a demultiplexer of the OMS to block traffic channels within a given spectrum from being propagated to downstream sections.

13. The system of claim 12, wherein configuring the demultiplexer of the OMS to block the traffic channels includes blocking the traffic channels one bundle at a time.

14. The system of claim 12, wherein, in the absence of traffic channels within the OMS, omitting the step of configuring the demultiplexer to block traffic channels.

15. A system comprising:
a processing device; and
a memory device configured to store a computer program having instructions that, when executed, enable the processing device to:
analyze a state of at least one component of an in-service Optical Multiplex Section (OMS) in an optical network;
based on a need to re-calibrate the at least one component of the OMS, transition the OMS from an in-service mode to a maintenance mode to prepare the OMS for re-calibration;
perform a re-calibration procedure; and
in response to completing the re-calibration procedure, transition the OMS from the maintenance mode back to the in-service mode, wherein the at least one component of the OMS includes one or more fiber spans, and wherein the re-calibration procedure includes re-setting target launch power profiles for a given spectrum for the one or more fiber spans, and wherein re-setting the target launch power profiles includes:
  measuring fiber loss or fiber length over the one or more fiber spans;
  determining a fiber type of the one or more fiber spans; and
  re-setting the target launch power profiles based on the measured fiber loss or fiber length and the fiber type.

16. The system of claim 15, wherein re-setting further includes re-setting the target launch power profiles per spectrum band, and wherein the profile for one band of the spectrum is different from another band of the spectrum.

17. A system comprising:
  a processing device; and
  a memory device configured to store a computer program having instructions that, when executed, enable the processing device to:
    analyze a state of at least one component of an in-service Optical Multiplex Section (OMS) in an optical network;
    based on a need to re-calibrate the at least one component of the OMS, transition the OMS from an in-service mode to a maintenance mode to prepare the OMS for re-calibration;
    perform a re-calibration procedure; and
    in response to completing the re-calibration procedure, transition the OMS from the maintenance mode back to the in-service mode,
    wherein the re-calibration procedure includes:
      receiving user-defined provisioning for one or more actuators in the OMS that includes user-defined target launch power profiles, amplifier target gain settings, ripple or tilt settings, attenuator target loss settings, and/or change of fiber characteristics; and
      re-setting one or more actuators based on the user-defined provisioning and continuing the re-calibration procedure for remaining actuators by re-setting the one or more actuators to newly calibrated targets.

18. The system of claim 17, wherein transitioning the OMS from the in-service mode to the maintenance mode includes configuring a multiplexer of the OMS to switch traffic channels within a given spectrum to Amplified Spontaneous Emission (ASE) filler channels.

19. A system comprising:
  a processing device; and
  a memory device configured to store a computer program having instructions that, when executed, enable the processing device to:
    analyze a state of at least one component of an in-service Optical Multiplex Section (OMS) in an optical network;
    based on a need to re-calibrate the at least one component of the OMS, transition the OMS from an in-service mode to a maintenance mode to prepare the OMS for re-calibration;
    perform a re-calibration procedure; and
    in response to completing the re-calibration procedure, transition the OMS from the maintenance mode back to the in-service mode,
    wherein transitioning the OMS from the maintenance mode back to the in-service mode includes:
      configuring a multiplexer of the OMS to switch Amplified Spontaneous Emission (ASE) filler channels to traffic channels; and
      configurating a demultiplexer of the OMS to unblock propagation of traffic channels to downstream sections.

20. The system of claim 17, wherein switching the ASE filler channels to traffic channels includes switching to traffic channels one bundle at a time, and wherein unblocking propagation of traffic channels include unblocking the traffic channels one bundle at a time.

* * * * *